(12) United States Patent
Kaneko et al.

(10) Patent No.: US 7,177,754 B2
(45) Date of Patent: Feb. 13, 2007

(54) EXHAUST GAS RECIRCULATION APPARATUS

(75) Inventors: Junichi Kaneko, Saitama (JP); Toshiko Okazaki, Saitama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 50 days.

(21) Appl. No.: 11/151,698

(22) Filed: Jun. 13, 2005

(65) Prior Publication Data

US 2005/0273243 A1    Dec. 8, 2005

Related U.S. Application Data

(63) Continuation of application No. PCT/JP03/15695, filed on Dec. 9, 2003.

(30) Foreign Application Priority Data

Dec. 11, 2002    (JP)    .............................. 2002-358898

(51) Int. Cl.
*F02D 41/00*    (2006.01)
*F02M 25/07*    (2006.01)

(52) U.S. Cl. .................. 701/104; 701/108; 123/568.22

(58) Field of Classification Search ................ 701/104, 701/108, 109, 102, 101; 123/568.19, 568.21, 123/568.22

See application file for complete search history.

(56) References Cited

U.S. PATENT DOCUMENTS

| | | | | |
|---|---|---|---|---|
| 4,445,489 A | * | 5/1984 | Kobayashi et al. | ......... 123/486 |
| 6,227,182 B1 | * | 5/2001 | Muraki et al. | ......... 123/568.21 |
| 6,564,778 B2 | * | 5/2003 | Isobe et al. | ................. 701/108 |
| 6,725,832 B2 | * | 4/2004 | Yokoyama et al. | ..... 123/568.19 |

FOREIGN PATENT DOCUMENTS

| | | |
|---|---|---|
| JP | 5-43863 | 7/1993 |
| JP | 8-121293 | 5/1996 |
| JP | 9-126023 | 5/1997 |
| JP | 9-308294 | 11/1997 |
| JP | 11-125147 | 5/1999 |

(Continued)

OTHER PUBLICATIONS

International Search Report for International Application No.: PCT/JP03/15695 mailed on Mar. 16, 2004 and English Translation thereof (8 pages).

*Primary Examiner*—Hieu T. Vo
(74) *Attorney, Agent, or Firm*—Wenderoth, Lind & Ponack, L.L.P.

(57) ABSTRACT

In an electronic control unit 31, a duty conversion map 41 from which a driving duty in energizing and driving an electromagnetic coil, not shown, of an electromagnetic vacuum adjustment valve 12 on the basis of a variable equivalent to target quantity of feedback of exhaust gas, for example, the magnitude of a desired negative pressure to a negative pressure output port (not shown) of the electromagnetic vacuum adjustment valve 12, and a duty correction map 42 from which a correction value for the driving duty is acquired on the basis inputted battery voltage and engine cooling water temperature, are provided. The driving duty is multiplied by the correction value acquired from the duty correction map 42, and on the basis of the corrected driving duty, energization to the electromagnetic vacuum adjustment valve 12 is performed by a driving circuit 26.

31 Claims, 11 Drawing Sheets

FOREIGN PATENT DOCUMENTS

| | | |
|---|---|---|
| JP | 11-336569 | 12/1999 |
| JP | 2001-123873 | 5/2001 |
| JP | 2001-193573 A * | 7/2001 |
| JP | 2002-235606 | 8/2002 |
| JP | 2002-285888 | 10/2002 |

* cited by examiner

EXHAUST GAS RECIRCULATION APPARATUS

BACKGROUND OF THE INVENTION

1. Field of the Invention

The present invention relates to an exhaust gas recirculation apparatus and particularly to an exhaust gas recirculation apparatus in which improvements of control characteristics of an electrically controlled valve are made.

2. Description of the Related Art

An exhaust gas recirculation apparatus (hereinafter referred to as "EGR apparatus") is a well known apparatus that feeds a part of exhaust gas back to an intake system, lowers the maximum temperature in combustion of mixed gas, and thus restrains the quantity of generated NOx, in order to reduce nitrogen oxide in the exhaust gas.

In such an EGR apparatus, a valve is usually provided at the position where a part of the exhaust gas is fed back to the intake system and its opening is adjusted to adjust the quantity of feedback of the exhaust gas to the intake system. As such a valve, typically, an electrically operated so-called electromagnetic valve is preferably used in view of ease and the like due to its electric control. Many apparatuses of such structures have been proposed (for example, see JP-A-2002-285888).

Meanwhile, when an electromagnetic valve is used for adjusting the quantity of feedback of the exhaust gas in the EGR apparatus, there is a problem that the temperature characteristics of the electromagnetic valve are affected by the control accuracy of the quantity of feedback. That is, an electromagnetic coil forming the electromagnetic valve typically has a resistance component and this resistance component varies depending on the ambient temperature and the temperature of the electromagnetic coil itself. As a result, the energizing current changes and this affects the valve opening, that is, the quantity of feedback of the exhaust gas. Such a problem can similarly occur in a motor-driven valve.

As a solution to such current changes in the electromagnetic coil, for example, a technique of detecting the actual current value and changing the quantity of energization to the original value by feedback control may be considered.

As a solution without using feedback control, for example, a technique of finding an estimate value of coil temperature by a predetermined arithmetic expression and adjusting the quantity of energization to the coil in accordance with the estimate value is well known (for example, see JP-A-2001-214766).

However, for example, in a situation where a circuit for such feedback control cannot be newly added because of sharing or the like of an energizing circuit for the electromagnetic coil, it may be demanded to restrain current changes in the electromagnetic coil without using feedback control based on current value detection. The above-described former technique is not necessarily reliable.

In the case of the above-described latter technique, the current correction is solely based on the estimate value of the coil temperature. The technique is insufficient if there are other factors that cause changes in the current flowing through the electromagnetic coil.

SUMMARY OF THE INVENTION

It is an object of the present invention to provide a driving control method for an electrically controlled valve in an exhaust gas recirculation apparatus and an exhaust gas recirculation apparatus that enable accurate adjustment of a driving current for the electrically controlled valve with a relatively simple structure.

It is another object of the present invention to provide a driving control method for an electrically controlled valve in an exhaust gas recirculation apparatus, and an exhaust gas recirculation apparatus that enable stable energization and driving of the electrically controlled valve.

According to a first aspect of this invention, there is provided a driving control method for an electrically controlled valve used for adjusting the quantity of feedback of exhaust gas to an intake part in an exhaust gas recirculation apparatus, the method including:

finding a driving duty to a variable equivalent to a target quantity of feedback of exhaust gas by using a duty conversion map that is preset to provide a driving duty of the electrically controlled valve to a variable equivalent to a target quantity of feedback of exhaust gas; and finding a correction value to detected battery voltage and engine cooling water temperature by using a duty correction map that is preset to provide a correction value to the driving duty from battery power and engine cooling water temperature, then finding a new driving duty for driving the electrically controlled valve on the basis of the correction value and the former driving duty, and driving the electrically controlled valve with the new driving duty.

In this structure, a so-called standard value of the driving duty is found by using the duty conversion map that is preset on the basis of the results of experiments and the like, and correction is made based on the battery voltage and the engine cooling water temperature, which are primary factors causing changes in the driving current. The corrected driving duty is used for driving the electrically controlled valve. Therefore, it is possible to control the driving current more accurately than in the conventional techniques, without using feedback control.

According to a second aspect of this invention, there is provided a driving control method for an electrically controlled valve used for adjusting the quantity of feedback of exhaust gas to an intake part in an exhaust gas recirculation apparatus, the method including:

finding an estimate resistance value by predetermined estimate resistance value calculation processing to calculate an estimate resistance value of an electromagnetic coil of the electrically controlled valve;

dividing a detected battery voltage by the estimate resistance value to find a resulting division value;

finding a target driving current by predetermined target driving current calculation processing to calculate a target driving current that energizes the electrically controlled valve; and finding a driving duty to the calculated target driving current and division value by using a duty decision map that is preset to provide a driving duty in energizing the electrically controlled valve from the target driving current and the division value, and driving the electrically controlled valve with the driving duty.

In this structure, a driving duty is found by using the duty decision map from the target driving current acquired in advance by the predetermined target driving current processing based on the results of experiments or the like, the battery voltage, which is a primary factor causing changes in the driving current, and the estimate resistance value of the electromagnetic coil. As correction based on temperature changes is taken into consideration in advance with respect to the driving duty found by using the duty decision map, it is possible to control the driving current more accurately than in the conventional techniques, without using feedback control.

According to a third aspect of this invention, there is provided a driving control method for an electrically controlled valve for turbine used for adjusting the quantity of passage of exhaust gas through a turbine connection tube provided to connect inlet and outlet ports of an exhaust turbine provided at a halfway part of an exhaust duct in an exhaust gas recirculation apparatus, the method including:

finding an estimate resistance value by predetermined estimate resistance value calculation processing to calculate an estimate resistance value of an electromagnetic coil of the electrically controlled valve for turbine;

dividing a detected battery voltage by the estimate resistance value to find a resulting division value;

finding a target driving current by predetermined target driving current calculation processing to calculate a target driving current that energizes the electrically controlled valve for turbine; and finding a driving duty to the calculated target driving current and division value by using a duty decision map that is preset to provide a driving duty in energizing the electrically controlled valve for turbine from the target driving current and the division value, and driving the electrically controlled valve for turbine with the driving duty.

According to a fourth aspect of this invention, there is provided an exhaust gas recirculation apparatus capable of adjusting the quantity of feedback of exhaust gas from an engine by driving an electrically controlled valve, the apparatus including:

basic driving duty output means that outputs a driving duty for the electrically controlled valve with respect to input of a variable equivalent to a target quantity of feedback of exhaust gas;

correction value output means that outputs a correction value for the driving duty from inputted battery voltage and engine cooling water temperature;

corrected driving duty calculation means that finds a new driving duty on the basis of the correction value provided from the correction value output means and the driving duty provided from the basic driving duty output means; and driving means that drives the electrically controlled valve on the basis of the value calculated by the corrected driving duty calculation means.

According to a fifth aspect of this invention, there is provided an exhaust gas recirculation apparatus capable of adjusting the quantity of feedback of exhaust gas from an engine by driving an electrically controlled valve, the apparatus including:

an electronic control unit that arithmetically calculates a driving duty for the electrically controlled valve; and a driving circuit that energizes and drives the electrically controlled valve on the basis of the driving duty from the electronic control unit;

wherein the electronic control unit finds an estimate resistance value by predetermined estimate resistance value calculation processing to calculate an estimate resistance value of an electromagnetic coil of the electrically controlled valve, divides a detected battery voltage by the estimate resistance value to find a resulting division value;

finds a target driving current by predetermined target driving current calculation processing to calculate a target driving current that energizes the electrically controlled valve, and finds a driving duty to the calculated target driving current and division value by using a duty decision map that is preset to provide a driving duty in energizing the electrically controlled valve from the target driving current and the division value, and outputs the driving duty to the driving circuit.

According to a sixth aspect of this invention, there is provided an exhaust gas recirculation apparatus in which a turbine connection tube is provided to connect inlet and outlet ports of an exhaust turbine provided at a halfway part of an exhaust duct and in which an electrically controlled valve for turbine used for adjusting the quantity of passage of exhaust gas through the turbine connection tube is provided, the apparatus including:

an electronic control unit that arithmetically calculates a driving duty for the electrically controlled valve for turbine; and a driving circuit that energizes and drives the electrically controlled valve for turbine on the basis of the driving duty from the electronic control unit;

wherein the electronic control unit finds an estimate resistance value by predetermined estimate resistance value calculation processing to calculate an estimate resistance value of an electromagnetic coil of the electrically controlled valve for turbine, divides a detected battery voltage by the estimate resistance value to find a resulting division value, finds a target driving current by predetermined target driving current calculation processing to calculate a target driving current that energizes the electrically controlled valve for turbine, and finds a driving duty to the calculated target driving current and division value by using a duty decision map that is preset to provide a driving duty in energizing the electrically controlled valve for turbine from the target driving current and the division value, and drives the electrically controlled valve for turbine with the driving duty.

DETAILED DESCRIPTION OF THE PREFERRED EMBODIMENTS

This invention will be described in detail with reference to the accompanying drawings.

The members, arrangements and the like that are described hereinafter are not intended to limit this invention and various modifications can be made without departing from the scope of this invention.

Figure 1:
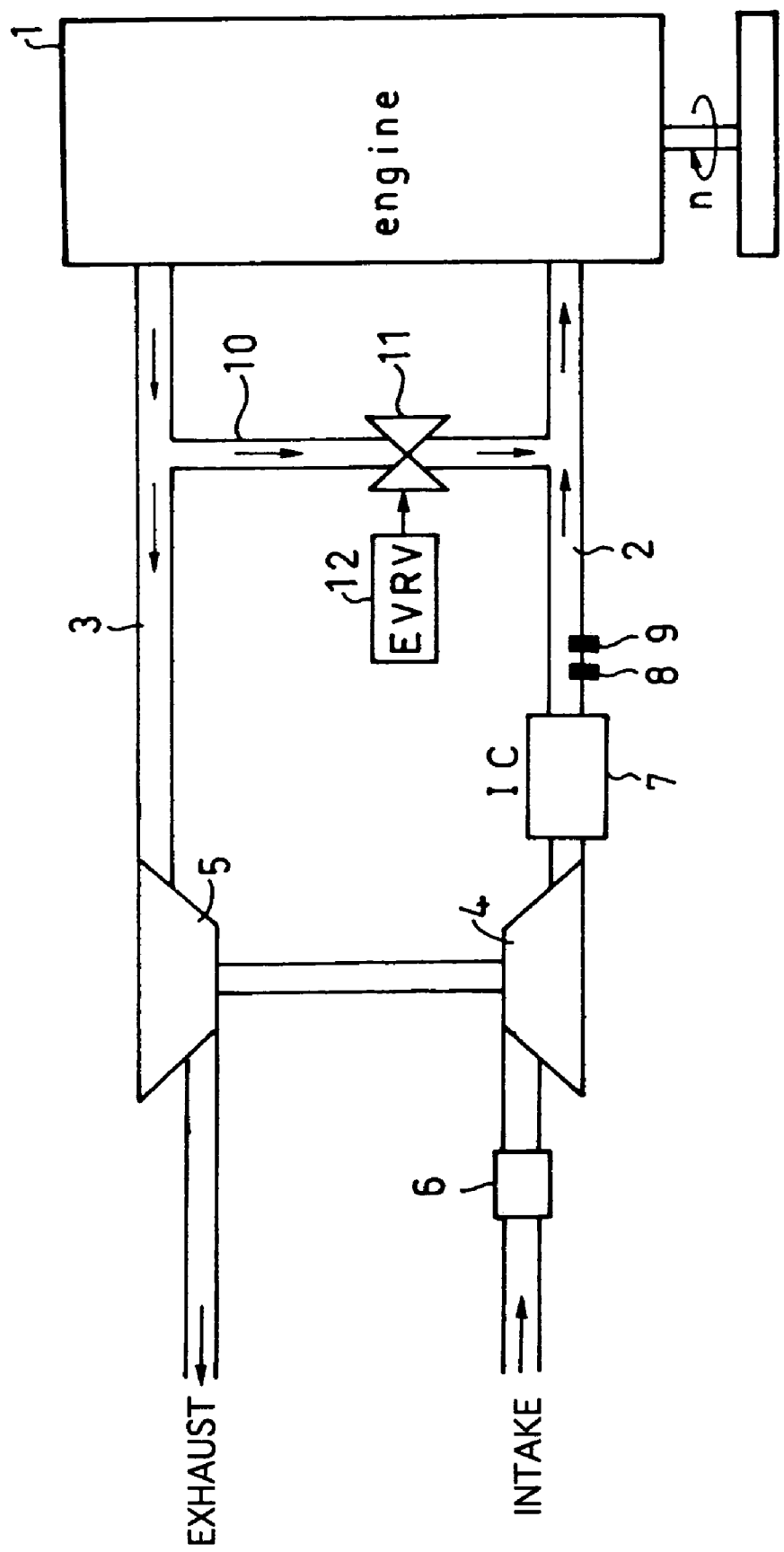
FIG. 1 is a structural view showing a schematic structure of an exhaust gas recirculation apparatus according to an embodiment of this invention.

First, an overall schematic structure of an exhaust gas recirculation apparatus according to an embodiment of this invention will be described with reference to FIG. 1.

This exhaust gas recirculation apparatus (hereinafter referred to as EGR apparatus") has a well-known basic structure except that a technique for driving an electromagnetic vacuum adjustment valve (in FIG. 1, denoted by "EVRV") 12 as an electrically controlled valve, which will be described in detail later, is different from the conventional technique. That is, in an engine 1 employing, for example, a diesel engine, an intake duct 2 to take in necessary air for combustion is connected to an intake manifold (not shown), and an exhaust duct 3 for emitting exhaust gas from the engine 1 is connected to an exhaust manifold (not shown).

A compressor 4 is provided at an appropriate position in the intake duct 2 and therefore the intake air with increased pressure can be fed into the engine 1. This compressor 4 has a rotary shaft (not shown) interconnected with the rotary shaft of an exhaust turbine 5 provided at a halfway position in the exhaust duct 3. Therefore, the compressor 4 is rotationally driven by the driving force of the exhaust turbine 5 rotated by the exhaust gas.

At an appropriate site in the intake duct 2 near the inlet of this compressor 4, an intake sensor 6 having a well-known structure to detect the quantity of intake air is provided.

On the other hand, an intercooler (in FIG. 1, denoted by "IC") 7 is provided near the outlet of the compressor 4 to lower the intake air temperature raised by the compression. Moreover, an intake air temperature sensor 8 and a boost pressure sensor 9 are provided near the outlet of the intercooler 7.

The intake duct 2 and the exhaust duct 3 are interconnected by a connection tube 10 provided at an appropriate site between the compressor 4 and the exhaust turbine 5 on one hand and the engine 1 on the other hand. At a halfway position in this connection tube 10, an exhaust gas recirculation valve 11 is provided and the quantity of feedback of the exhaust gas from the exhaust duct 3 to the intake duct 2 is decided by adjusting the opening of the exhaust gas recirculation valve 11. In the embodiment of this invention, the exhaust gas recirculation valve 11 is a so-called negative-pressure type valve with its valve opening changed by the magnitude of a negative pressure introduced from outside. An electromagnetic vacuum adjustment valve 12 is used for adjusting the introduced negative pressure.

Figure 2:
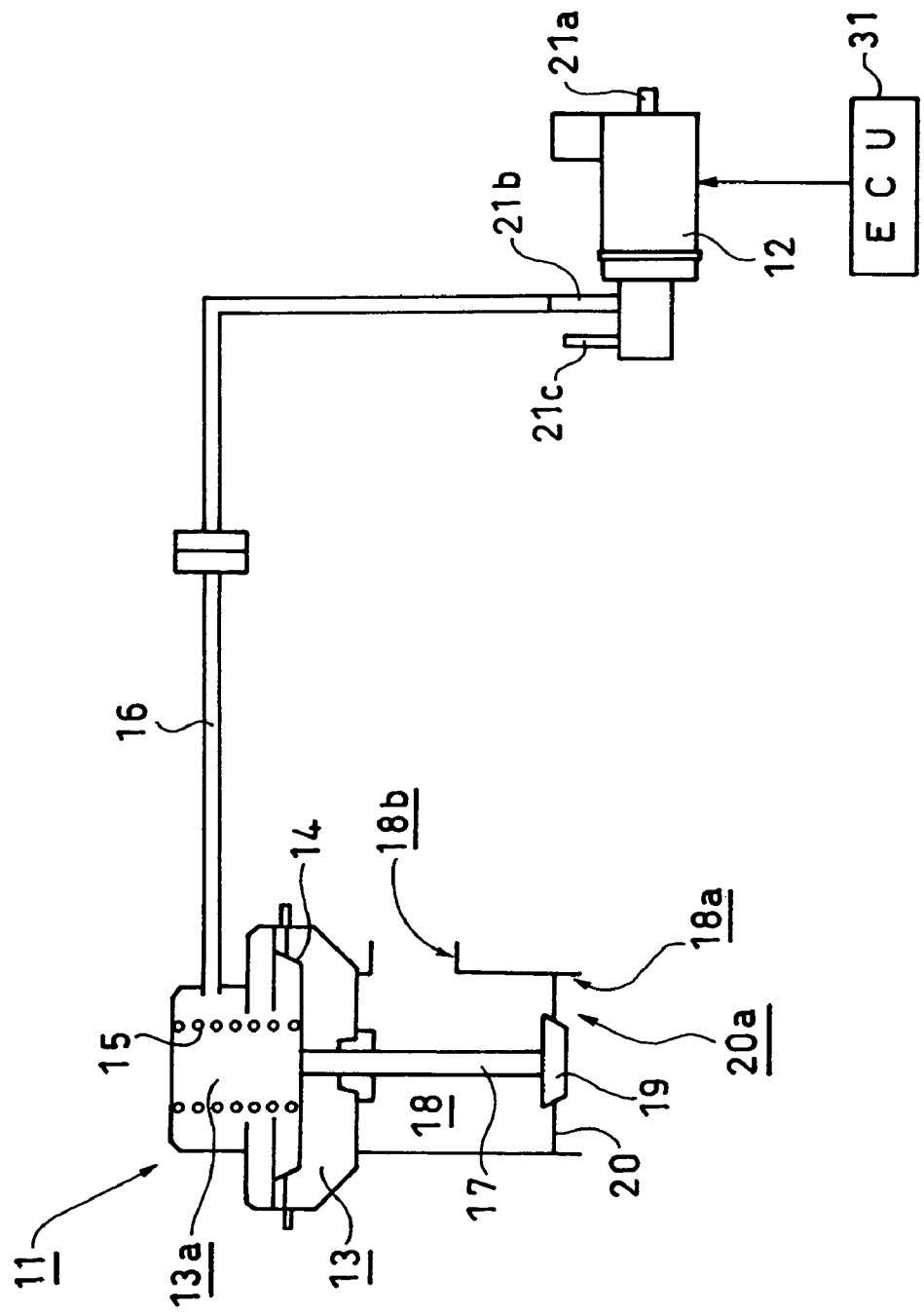
FIG. 2 is a structural view showing an exemplary structure of an exhaust gas recirculation valve used in the exhaust gas recirculation apparatus shown in FIG. 1.

FIG. 2 shows a specific exemplary structure of the exhaust gas recirculation valve 11 according to the embodiment of this invention. Hereinafter, this exemplary structure will be described with reference to FIG. 2.

This exhaust gas recirculation valve 11 is a well-known so-called diaphragm valve utilizing a negative pressure.

That is, the exhaust gas recirculation valve 11 has a diaphragm chamber 13. In this diaphragm chamber 13, a diaphragm 14 is provided to bisect the chamber. A coil spring 15 is provided on one side of the diaphragm 14, and the diaphragm 14 is biased into the opposite direction (direction of the side opposite to the side of the diaphragm 14 where the coil spring 15 is provided) by the coil spring 15. In a room 13a where this coil spring 15 is provided, a negative pressure is introduced by the electromagnetic vacuum adjustment valve 12 via a vacuum tube 16. (This will be described in detail later.)

On the other side of the diaphragm 14, a valve shaft 17 is attached and penetrates the diaphragm chamber 13. In an exhaust gas feeding chamber 18 provided next to the diaphragm chamber 13, a valve member 19 is attached to the distal end of the valve shaft 17.

The exhaust gas feeding chamber 18 is provided with an exhaust gas inlet 18a and an exhaust gas outlet 18b. The exhaust gas inlet 18a is connected to the connection tube 10 so that it is situated on the exhaust duct 3 side, and the exhaust gas outlet 18b is connected to the connection tube 10 so that it is situated on the intake duct 2 side.

Near the exhaust gas inlet 18a, a partition 20 having a through-hole 20a is provided. In this through-hole 20a, the valve member 19 can be fitted or removed by adjusting the negative pressure in the diaphragm chamber 13.

The electromagnetic vacuum adjustment valve 12 has a well-known structure that has an electromagnetic coil, not shown, and that can adjust introduction of the negative pressure to the exhaust gas recirculation valve 11 by controlling an energizing current to the electromagnetic coil. That is, the electromagnetic vacuum adjustment valve 12 has an atmosphere input port 21a for introducing the atmosphere, a negative pressure output port 21b connected with the above-mentioned vacuum tube 16 to output a negative pressure, and a negative pressure input port 21c connected with a vacuum pump, not shown, to input a negative pressure. The electromagnetic vacuum adjustment valve 12 is adapted for adjusting the quantity of energization to the electromagnetic coil provided therein to displace its member, not shown, and thus adjusting the negative pressure output from the negative pressure output port 21b.

The energization to this electromagnetic coil is controlled by an electronic control unit (in FIG. 2, denoted by "ECU") 31. This electronic control unit 31 is adapted for performing various controls such as engine drive control and fuel injection control of a vehicle. The electronic control unit 31 is constructed mainly by a so-called microcomputer, which executes each control program for engine drive control or the like to realize necessary control.

The above-described structure is a basic part common to first to third exemplary structures that will be described in detail hereinafter.

Figure 3:
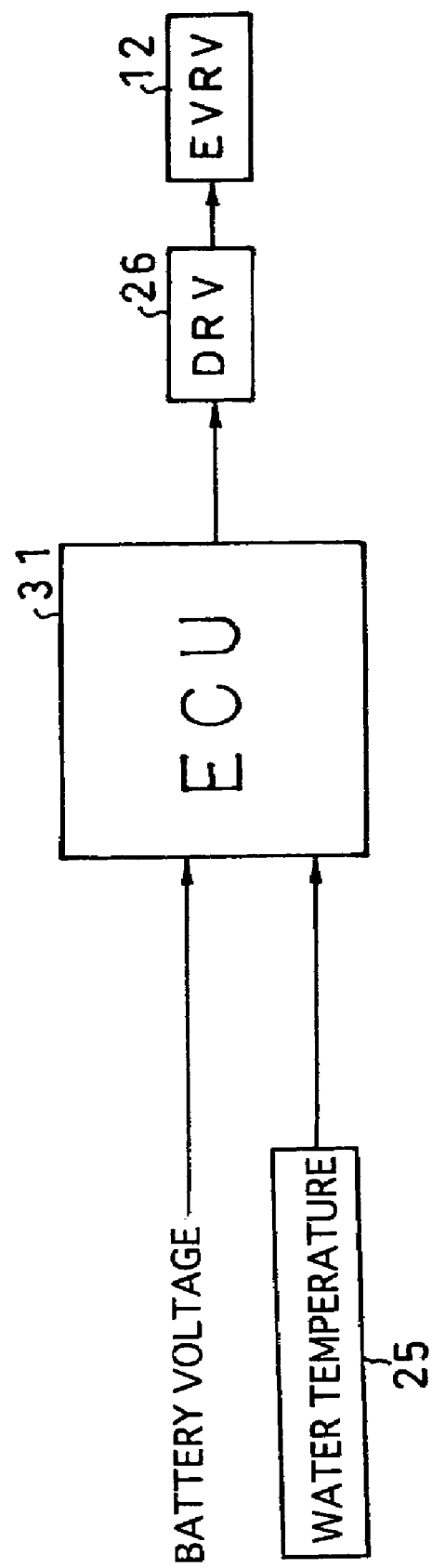
FIG. 3 is a structural view showing an exemplary structure of a constituent part centering on an electronic control unit in a first exemplary structure of the exhaust gas recirculation apparatus according to the embodiment of this invention.

Next, the first exemplary structure for controlling the electrically controlled valve in the exhaust gas recirculation apparatus will be described with reference to FIGS. 3 and 4.

First, the structure centering on the electronic control unit 31 will be described with reference to FIG. 3. In this first exemplary structure, a battery voltage and water temperature detected by a water temperature sensor 25 that detects the temperature of cooling water for the engine 1 (engine cooling water temperature) are inputted to the electronic control unit 31, and on the basis of these input data, driving control of the electromagnetic vacuum adjustment valve 12 is performed as follows.

Figure 4:
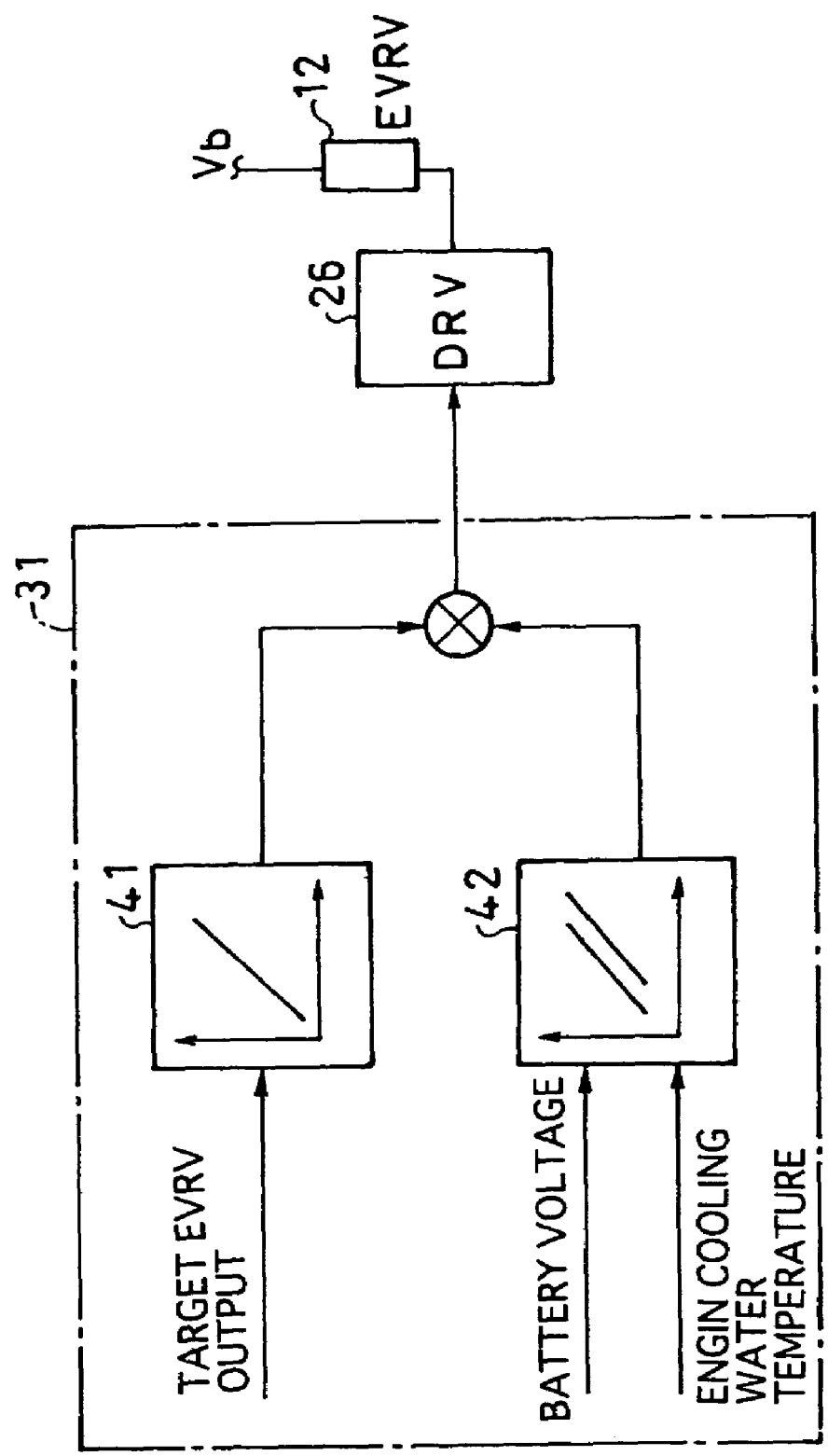
FIG. 4 is a n explanatory view for explaining specific arithmetic processing in the first exemplary structure shown in FIG. 3.

That is, in this first exemplary structure, a duty conversion map 41 as basic driving duty output means and a duty correction map 42 as correction value output means are stored in a storage unit, not shown, of the electronic control unit 31 (see FIG. 4).

The duty conversion map 41 decides and outputs a driving duty of a repetitive driving pulse signal that should be applied to the electromagnetic coil, not shown, of the electromagnetic vacuum adjustment valve 12 on the basis of a desired value of negative pressure (hereinafter referred to as "target EVRV output") when making an output to the negative pressure output port 21b of the electromagnetic vacuum adjustment valve 12. This duty conversion map 41 is preferably defined on the basis of experiments, simulations or the like. It is also preferable to use, for example, a target quantity of passing air in the exhaust gas recirculation valve 11, instead of the target EVRV output. In other words, it can be said that both the target EVRV output and the target quantity of passing air substantially represent the target quantity of feedback of exhaust gas.

Here, the target EVRV output is decided by an exhaust gas recirculation control program executed in the electronic control unit 31, though not described in detail. That is, in this program, a required quantity of exhaust gas recirculation is found on the basis of data such as the driving state of the engine 1 and a required value of negative pressure to the negative pressure output port 21b of the electromagnetic vacuum adjustment valve 12 to provide the quantity of exhaust gas recirculation is found as the target EVRV output.

The quantity of energization to the electromagnetic coil, not shown, of the electromagnetic vacuum adjustment valve 12 in the embodiment of this invention is adjusted by controlling the duty factor of the repetitive driving pulse. That is, the energization to the electromagnetic coil, not shown, of the electromagnetic vacuum adjustment valve 12 is carried out by a driving circuit (in FIG. 3, denoted by "DRV") 26 as driving means. The driving circuit 26 performs energization and non-energization to the electromagnetic coil alternately and repeatedly in a pulse-like manner on the basis of the driving duty inputted from the electronic control unit 31. In accordance with the magnitude of the time ratio of the energization period to the non-energization period, the quantity of energization to the electromagnetic coil, namely, the magnitude of negative pressure output from the electromagnetic vacuum adjustment valve 12 is determined.

On the other hand, the duty correction map 42 is for finding a correction coefficient for the driving duty found by the above-described duty conversion map 41 on the basis of the voltage of a battery (not shown) of a vehicle, that is, the battery voltage, and the water temperature of the engine cooling water, which are inputted to the electronic control unit 31 as described above. Similar to the duty conversion map 41, the duty correction map 42 is preferably defined on the basis of experiments, simulations or the like.

In the electronic control unit 31, the driving duty found from the duty conversion map 41 as described above is multiplied and thus corrected by the correction coefficient found from the duty correction map 42. The driving duty that is found in consideration of changes in the energizing current to the electromagnetic vacuum adjustment valve 12 due to the atmospheric temperature and the battery voltage is outputted to the driving circuit 26 from the electronic control unit 31 and necessary energization for providing the target EVRV output is made to the electromagnetic vacuum adjustment valve 12. Instead of multiplying the driving duty found from the duty conversion map 41 by the correction coefficient found from the duty correction map 42, the correction coefficient may be added to the driving duty.

With the above-described structure, it is possible to restrain changes in the energizing current to the electromagnetic vacuum adjustment valve 12 due to the ambient temperature and the battery voltage and to perform more accurate driving control of the electromagnetic vacuum adjustment valve 12 without using feedback control.

The duty conversion map 41 and the duty correction map 42 in the above-described structure may be implemented, for example, as arithmetic expressions. That is, when the target EVRV output is decided as described above, the target EVRV output may be entered to a predetermined arithmetic expression for duty conversion to calculate a driving duty. As a matter of course, when the engine cooling water temperature and the battery voltage are entered, a correction coefficient may be calculated from a predetermined arithmetic expression for finding a correction coefficient.

Figure 5:
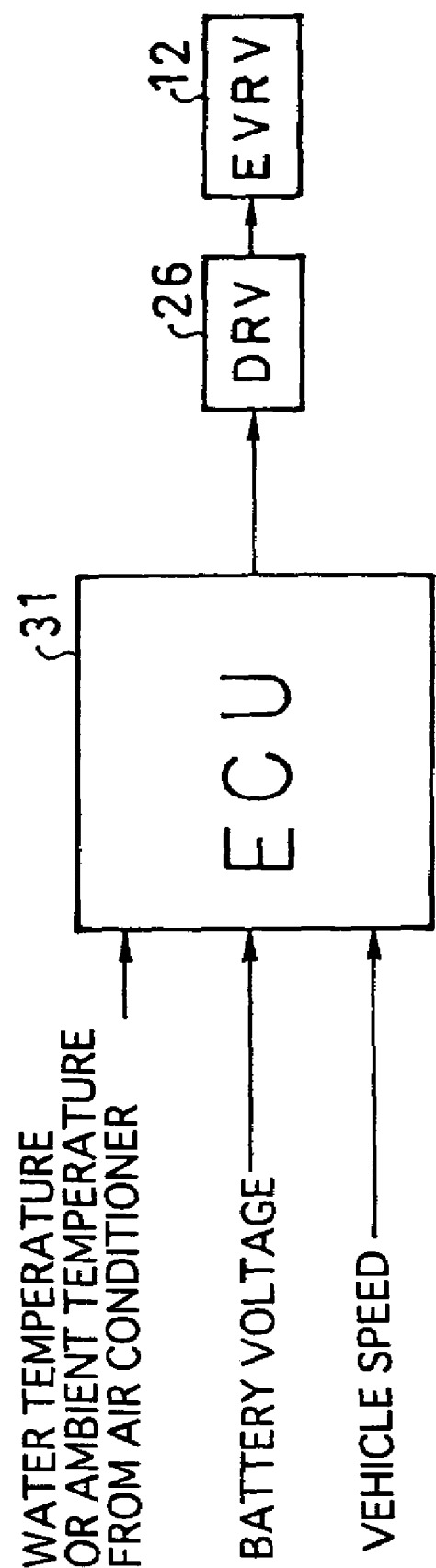
FIG. 5 is a structural view showing an exemplary structure of a basic constituent part that is common to second to fourth exemplary structures of the exhaust gas recirculation apparatus according to the embodiment of this invention.

Next, the second exemplary structure will be described with reference FIGS. 5 to 7.

First, a schematic structure centering on the electronic control unit 31 will be described with reference to FIG. 5. The same constituent elements as the constituent elements shown in FIGS. 1 to 4 are denoted by the same numerals and will not be described further in detail. Hereinafter, different parts will be described mainly.

In this second exemplary structure, the water temperature of engine cooling water or the ambient temperature, the battery voltage, the vehicle speed, and various data that will be described later are inputted to the electronic control unit 31. Arithmetic processing based on these various data is performed by the electronic control unit 31. A driving duty for the electromagnetic vacuum adjustment valve 12 is outputted. Driving control of the electromagnetic vacuum adjustment valve 12 is thus performed via the driving circuit 26 (see FIG. 5).

Here, as the ambient temperature, a value detected by an ambient temperature sensor (not shown) provided in a vehicle air conditioning device installed on a vehicle may be directly used, and as the vehicle speed, a value detected by a vehicle speed sensor (not shown) provided for engine revolution control may be directly used. Therefore, an ambient temperature sensor and a vehicle speed sensor need not be newly provided for this exhaust gas recirculation apparatus.

Next, fundamental procedures of specific arithmetic processing carried out in the electronic control unit 31 for providing a driving duty for the electromagnetic vacuum adjustment valve 12 will be described with reference to FIG. 6.

First, in the electronic control unit 31, EGR/boost calculation is performed to calculate a target current ($I_{EVRV}$). That is, as will be described in detail later, a current value at which the electromagnetic vacuum adjustment value 12 should be energized from the driving circuit 26 is found in accordance with predetermined operation procedures and is used for calculating a driving duty and for calculating EVRV heat generation, which will be described later.

Figure 6:
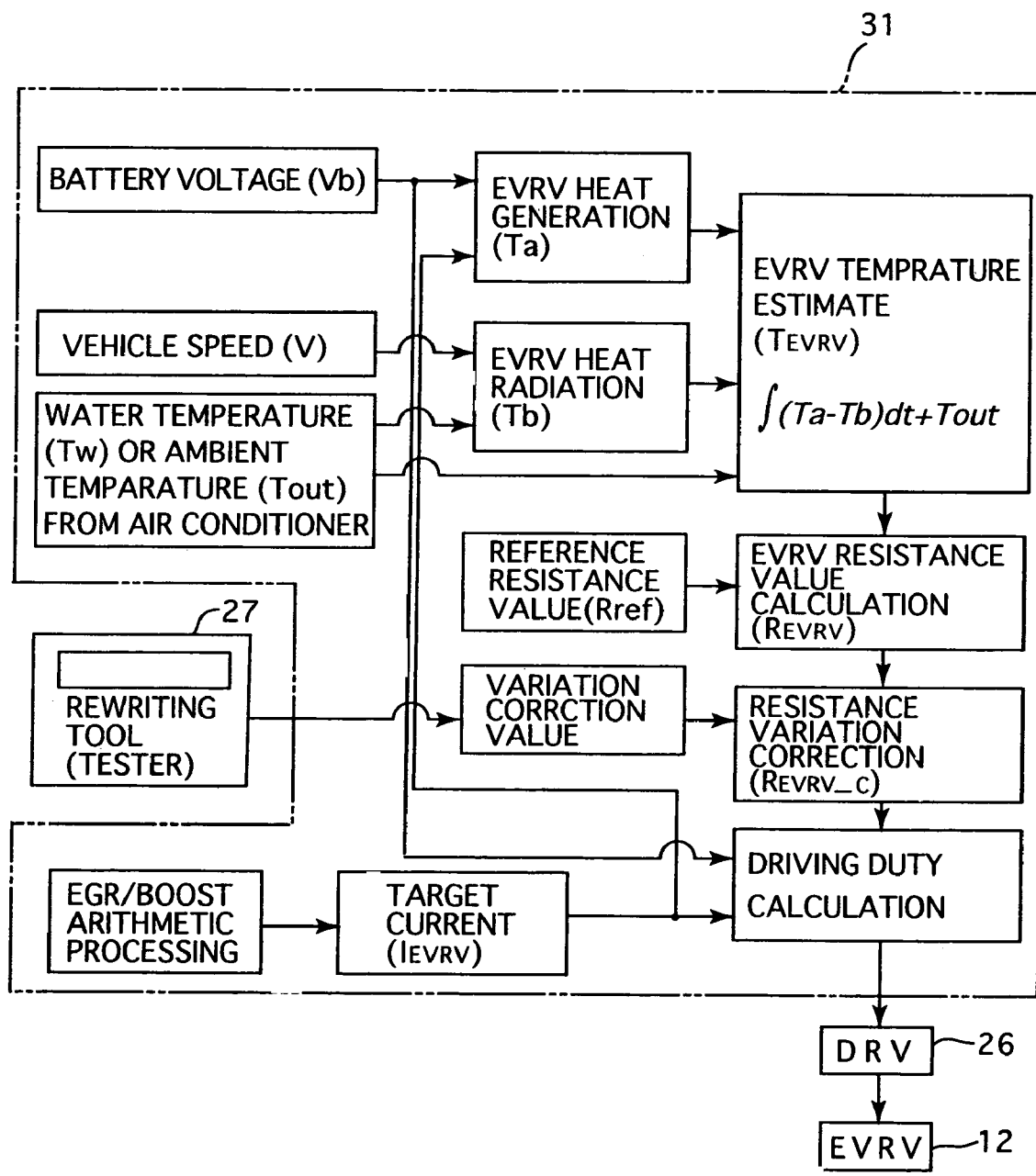
FIG. 6 is an explanatory view for explaining fundamental procedures of driving duty calculation processing that is common to the second to fourth exemplary structures of the exhaust gas recirculation apparatus according to the embodiment of this invention.

Meanwhile, on the basis of the battery voltage (Vb) and the above-described target current ($I_{EVRV}$), the heat generation temperature (in FIG. 6, denoted by "EVRV heat generation (Ta)") of the electromagnetic coil, not shown, of the electromagnetic vacuum adjustment valve 12 is calculated by a predetermined arithmetic expression. Here, the predetermined arithmetic expression for calculating the heat generation temperature is set on the basis of experiments, simulations or the like.

On the basis of the vehicle speed (v) and the water temperature (Tw) of the engine cooling water, or on the basis of the vehicle speed (v) and the ambient temperature (Tout), the heat radiation temperature (in FIG. 6, denoted by "EVRV heat radiation (Tb)") of the electromagnetic coil, not shown, of the electromagnetic vacuum adjustment valve 12 is calculated by a predetermined arithmetic expression. Here, the predetermined arithmetic expression for calculating the heat radiation temperature is set on the basis of experiments, simulations or the like.

Next, on the basis of the above-described EVRV heat generation (Ta), EVRV heat radiation (Tb), and water temperature (Tw) of the engine cooling water or ambient temperature (Tout), integral processing, that is, arithmetic processing of $\int(Ta-Tb)dt+Tout$, is performed to calculate an estimate temperature of the electromagnetic coil, not shown, of the electromagnetic vacuum adjustment valve 12 (in FIG. 6, denoted by "EVRV temperature estimate ($T_{EVRV}$)").

Next, with respect to the resistance value of the electromagnetic coil, not shown, of the electromagnetic vacuum adjustment valve 12, an estimate resistance value ($R_{EVRV}$) of the electromagnetic coil, not shown, of the electromagnetic vacuum adjustment valve 12 is calculated (in FIG. 6, denoted by "EVRV resistance value calculation ($R_{EVRV}$)") by a predetermined arithmetic expression based on, for example, a reference resistance value (Rref) defined in advance from experiments or the like as a resistance value at a standard atmospheric temperature or the like and stored in advance in a storage unit, not shown, of the electronic control unit 31, and the above-described EVRV temperature estimate ($T_{EVRV}$).

Next, variation correction of the above-described estimate resistance value ($R_{EVRV}$) of the electromagnetic coil is performed by using a variation correction value, and a corrected estimate resistance value ($R_{EVRV\_c}$) is found. Here, first of all, the variation correction value is for correcting the estimate resistance value ($R_{EVRV}$) of the electromagnetic coil in consideration of non-uniformity of the estimate resistance value ($R_{EVRV}$) of the electromagnetic coil due to difference in vehicle type and difference in various characteristics among individual vehicles of the same type.

This variation correction value is defined in advance from experiments or the like for each vehicle type and on the basis of difference in equipment of vehicles of the same type. The variation correction value is stored to be readable by what is called rewriting tool 27. This rewriting tool 27, which is also called tester, is prepared outside apart from the exhaust gas recirculation apparatus according to the embodiment of this invention. The rewriting tool 27 is connected with the electronic control unit 31 immediately before the shipment of the exhaust gas recirculation apparatus, and the variation correction value corresponding to the vehicle type, equipment and the like is written to a predetermined storage unit (not shown) of the electronic control unit 31 by the rewriting tool 27.

For the correction of the estimate resistance value ($R_{EVRV}$) using the variation correction value, various modes such as addition or subtraction of the variation correction value or multiplication by the variation correction value may be considered, and the variation correction value may be found from experiments or the like in accordance with the mode. The correction need not be limited to any specific mode here.

Then, from the corrected estimate resistance value ($R_{EVRV\_c}$) calculated as described above, the above-described target current ($I_{EVRV}$) and battery voltage (Vb), a driving duty is calculated by using a predetermined arithmetic expression or conversion map. Here, the predetermined arithmetic expression or conversion map used for calculating the driving duty is set on the basis of experiments, simulations or the like.

The driving duty thus calculated in the electronic control unit 31 is outputted to the driving circuit 26, and the electromagnetic vacuum adjustment valve 12 is energized with that driving duty by the driving circuit 26.

Next, a specific example of EGR/boost arithmetic processing will be described with reference to FIG. 7.

First, this EGR/boost arithmetic processing requires the following data: the number of engine revolutions Ne, which is the number of revolutions of the engine 1 (see FIG. 1); the quantity of fuel to be injected to the engine 1 by a fuel injection device, not shown, calculated in accordance with the state of revolution or the like of the engine 1, that is, required quantity of injection Qsoll; atmospheric pressure PATM; intake air temperature TATN detected by the intake air temperature sensor 8 (see FIG. 1); engine cooling water temperature Tw; and quantity of actual intake detected by the intake sensor 6. As the number of engine revolutions Ne, engine cooling water temperature Tw and atmospheric pressure PATM, values detected by their sensors provided for controlling the engine 1 of the vehicle can be used, and no additional sensors need be provided for this EGR/boost arithmetic processing.

For this EGR/boost arithmetic processing, a basic control map 43, an atmospheric pressure correction map 44, an intake air temperature correction map 45, a water temperature correction map 46 and a duty decision map 47 are prepared in advance in the electronic control unit 31. The specific details of these maps will be clarified in the following description of the arithmetic processing procedures.

First, a basic target value of the quantity of actual intake is found from the number of engine revolutions Ne and the required quantity of injection Qsoll. The basic control map 43 defines a basic target value of the quantity of actual intake from the number of engine revolutions Ne and the required quantity of injection Qsoll. The basic control map 43 is set on the basis of experiments, simulations or the like. Here in this exemplary structure, the basic target value equals to the quantity of intake (mg) per stroke (str) of the engine 1 and takes the unit of mg/str.

This basic target value is corrected by a correction value stored in an EEPROM (electrically erasable programmable read-only memory) 28 provided in the electronic control unit 31. The correction value stored in advance in this EEPROM 28 is for correcting the basic target value in consideration of variations in the characteristics among individual vehicles. This correction value is stored for each vehicle in the above-described rewriting tool 27. From the correction values, a correction value corresponding to a vehicle to be equipped with this exhaust gas recirculation apparatus is selected and written in advance to the EEPROM 28.

For the correction of the basic target value by the correction value read out from the EEPROM 28, specifically, addition of the correction value to the basic target value or multiplication of the basic target value by the correction value is preferred. In the case of addition, the correction value preferably takes the unit of mg/str, like the basic target value. In the case of multiplication, the correction value preferably takes the unit of %.

Here, the basic target value corrected by the correction value read out from the EEPROM 28 is called "first corrected basic target value" for convenience.

After the correction of the basic target value by the correction value read out from the EEPROM 28, correction based on the atmospheric pressure is made.

That is, this correction is for correcting the influence of the atmospheric pressure on the basic target value. A correction value found by using the atmospheric pressure correction map 44 on the basis of the atmospheric pressure PATM, which is actually measured data, is added to the above-described first corrected basic target value, or the above-described first corrected basic target value is multiplied by this correction value. The atmospheric pressure correction map 44 is formed by so-called mapping of preferable correction values to various atmospheric pressures on the basis of experiments, simulations or the like.

The first corrected basic target value that is corrected here is called second corrected basic target value" for convenience.

In the case of addition, the correction value acquired from the atmospheric pressure correction map 44 preferably takes the unit of mg/str, like the basic target value. In the case of multiplication, it preferably takes the unit of %.

Next, this second corrected basic target value is corrected by a correction value acquired from the intake air temperature correction map 45.

That is, the intake air temperature correction map 45 is for providing a correction value to correct the influence of the intake air temperature and the number of engine revolutions Ne on the basic target value. The intake air temperature correction map 45 is formed by so-called mapping of preferable correction values to various intake air temperatures and numbers of engine revolutions Ne on the basis of experiments, simulations or the like.

Then, the correction value found by using the intake air temperature correction map 45 on the basis of the intake air temperature TATN and the number of engine revolutions Ne, which are actually measured data, is added to the above-described second corrected basic target value, or the second corrected basic target value is multiplied by this correction value. The second corrected basic target value that is corrected here is called "third corrected basic target value" for convenience.

In the case of addition, the correction value acquired from the intake air temperature correction map 45 preferably takes the unit of mg/str, like the basic target value. In the case of multiplication, it preferably takes the unit of %.

Next, this third corrected basic target value is corrected by a correction value acquired from the water temperature correction map 46.

That is, the water temperature correction map 46 is for providing a correction value to correct the influence of the engine cooling water temperature (Tw) and the number of engine revolutions Ne on the basic target value. The water temperature correction map 46 is formed by so-called mapping of preferable correction values to various engine cooling water temperatures (Tw) and numbers of engine revolutions Ne on the basis of experiments, simulations or the like.

Then, the correction value acquired by using the water temperature correction map 46 on the basis of the engine cooling water temperature (Tw) and the number of engine revolutions Ne, which are actually measured data, is added to the above-described third corrected basic target value, or the third corrected basic target value is multiplied by this correction value. A fourth corrected basic target value is thus acquired. In the case of addition, the correction value acquired from the water temperature correction map 46 preferably takes the unit of mg/str, like the basic target value. In the case of multiplication, it preferably takes the unit of %.

Moreover, a limiter 53 is provided for preventing the fourth corrected basic target value from exceeding a predetermined positive value and from becoming a negative value. This limiter 53 directly outputs the fourth corrected basic target value up to a predetermined limit value. However, if the fourth corrected basic target value reaches the predetermined limit value, after that, the limiter 53 outputs the predetermined limit value until the fourth corrected basic target value becomes lower than the predetermined limit value. The output value from the limiter 53 is called "target air quantity value (arSoll)" for convenience.

Next, a target EVRV driving current (mA) is found by proportional control (in FIG. 7, denoted by "PI") using the target air quantity value (arSoll) and the quantity of actual intake (arIST). That is, the target EVRV driving current (mA) is decided so that the difference between the target air quantity value (arSoll) and the quantity of actual intake (arIST) becomes zero.

More specifically, for example, in the case of the target air quantity value (arSoll)>the quantity of actual intake (arIST), or in the case of the target air quantity value (arSoll)<the quantity of actual intake (arIST), the target EVRV driving current (mA) is found by the following PI control arithmetic expression (proportional/integral control arithmetic expression) in accordance with the difference (arSoll-arIST).

> Target EVRV driving current (mA)=difference×proportional coefficient+Σ(difference×integral coefficient)

Therefore, in the case of the target air quantity value (arSoll)>the quantity of actual intake (arIST), the target EVRV driving current (mA) is increased, whereas in the case of the target air quantity value (arSoll)<the quantity of actual intake (arIST), the target EVRV driving current (mA) is decreased.

When the target air quantity value (arSoll) is equal to the quantity of actual intake (arIST), the term of difference in the above-described PI control arithmetic expression becomes zero. Therefore, the target EVRV driving current (mA) at that point is maintained by the value of the integral term. In other words, the opening of the exhaust gas recirculation valve 11 is maintained.

Finally, from this target EVRV driving current (mA), the battery voltage (Vb) and the corrected estimate resistance value ($R_{EVRV\_c}$), a driving duty (EVRV duty) is found by using the duty decision map 47. That is, in the decision of the driving duty by using the duty decision map 47, the target EVRV driving current (mA), the battery voltage (Vb) and the corrected estimate resistance value ($R_{EVRV\_c}$) are used. First, the battery voltage (Vb) is divided by the corrected estimate resistance value ($R_{EVRV\_c}$) and the division value is found.

The duty decision map 47 is formed by mapping preferable driving duties to the target EVRV driving current (mA) and the division value $Vb/(R_{EVRV\_c})$ on the basis of experiments, simulations or the like. In the duty decision map 47, the driving duty is found from the target EVRV driving current (mA) and the division value $Vb/(R_{EVRV\_c})$.

Next, the third exemplary structure will be described with reference to FIG. 8.

Figure 7:
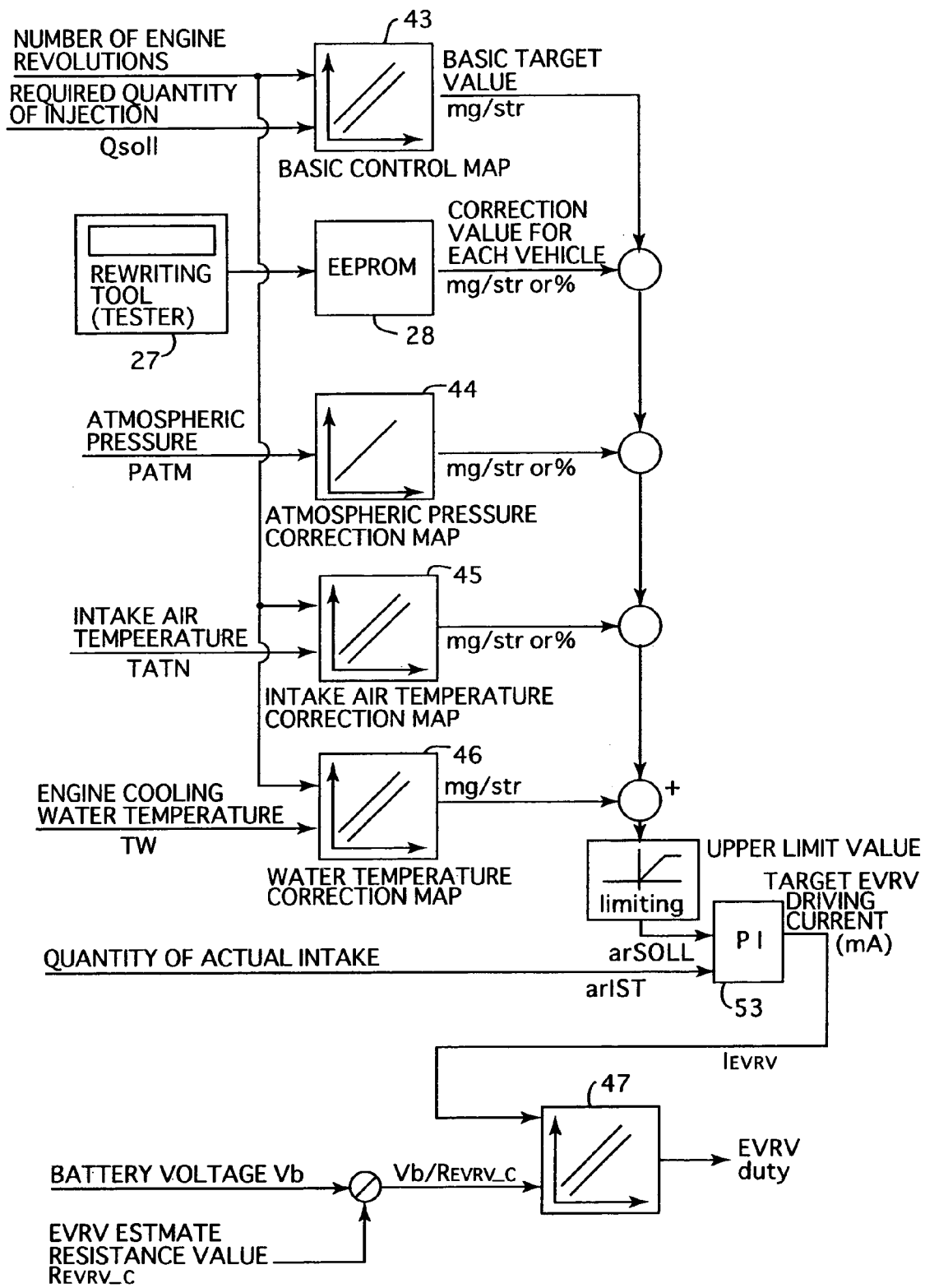
FIG. 7 is an explanatory view for explaining specific EGR/boost arithmetic processing in the second exemplary structure of the exhaust gas recirculation apparatus according to the embodiment of this invention.

The same constituent elements as the constituent elements shown in FIG. 7 are denoted by the same numerals and will not be described further in detail. Hereinafter, different parts will be described mainly.

This third exemplary structure does not include the intake sensor 6. Its basic structure is similar to the above-described structure shown in FIGS. 5 and 6 except that it does not include the intake sensor 6. The specific processing procedures of its EGR/boost arithmetic processing is different, which will now be described with reference to FIG. 8.

In this third exemplary structure, inputs to and outputs from a basic control map 43a, an atmospheric pressure correction map 44a, an intake air temperature correction map 45a and a water temperature correction map 46a are basically similar to those in the exemplary structure shown in FIG. 7. However, the unit of signals (data) to be outputted is different from the unit used in the case of FIG. 7. In this third exemplary structure, the maps except the basic control map 43a employ the unit of mA or %. The output value of the basic control map 43a uses the unit of mA.

In the case of adding a correction value, the unit is preferably mA. In the case of multiplication by a correction value, the unit is preferably %.

An EEPROM 28a is similar to the EEPROM in the exemplary structure of FIG. 7 in that it has a correction vale for each vehicle. The EEPROM 28a is different from the EEPROM in the exemplary structure of FIG. 7 in that it uses the unit of mA in the case of adding a correction value whereas it uses the unit of % in the case of multiplication by a correction value, as in the above-described maps.

On this assumption, first, a basic target value of an energizing current to the electromagnetic vacuum adjustment valve 12 is found from the basic control map 43a on the basis of the number of engine revolutions Ne and the required quantity of injection Qsoll. Next, this basic target value is corrected by a correction value read out from the EEPROM 28a. Here, writing data to the EEPROM 28a is carried out by a rewriting tool 27a. This rewriting tool 27a is basically similar to the rewriting tool 27 in the exemplary structure of FIG. 7.

After the correction by the correction value from the EEPROM 28a, the basic target value is sequentially corrected by a correction value acquired from the atmospheric pressure correction map 44a, a correction value acquired from the intake air temperature correction map 45a and a correction value acquired from the water temperature correction map 46a. A target EVRV driving current (mA) is thus provided.

From this target EVRV driving current (mA), the battery voltage (Vb) and the corrected estimate resistance value ($R_{EVRV\_c}$), a driving duty (EVRV duty) is found by using the duty decision map 47 in a manner as described in the exemplary structure of FIG. 7.

Next, a fourth exemplary structure will be described with reference to FIGS. 9 and 10.

The same constituent elements as the constituent elements shown in FIG. 7 are denoted by the same numerals and will not be described further in detail. Hereinafter, different parts will be described mainly.

Figure 9:
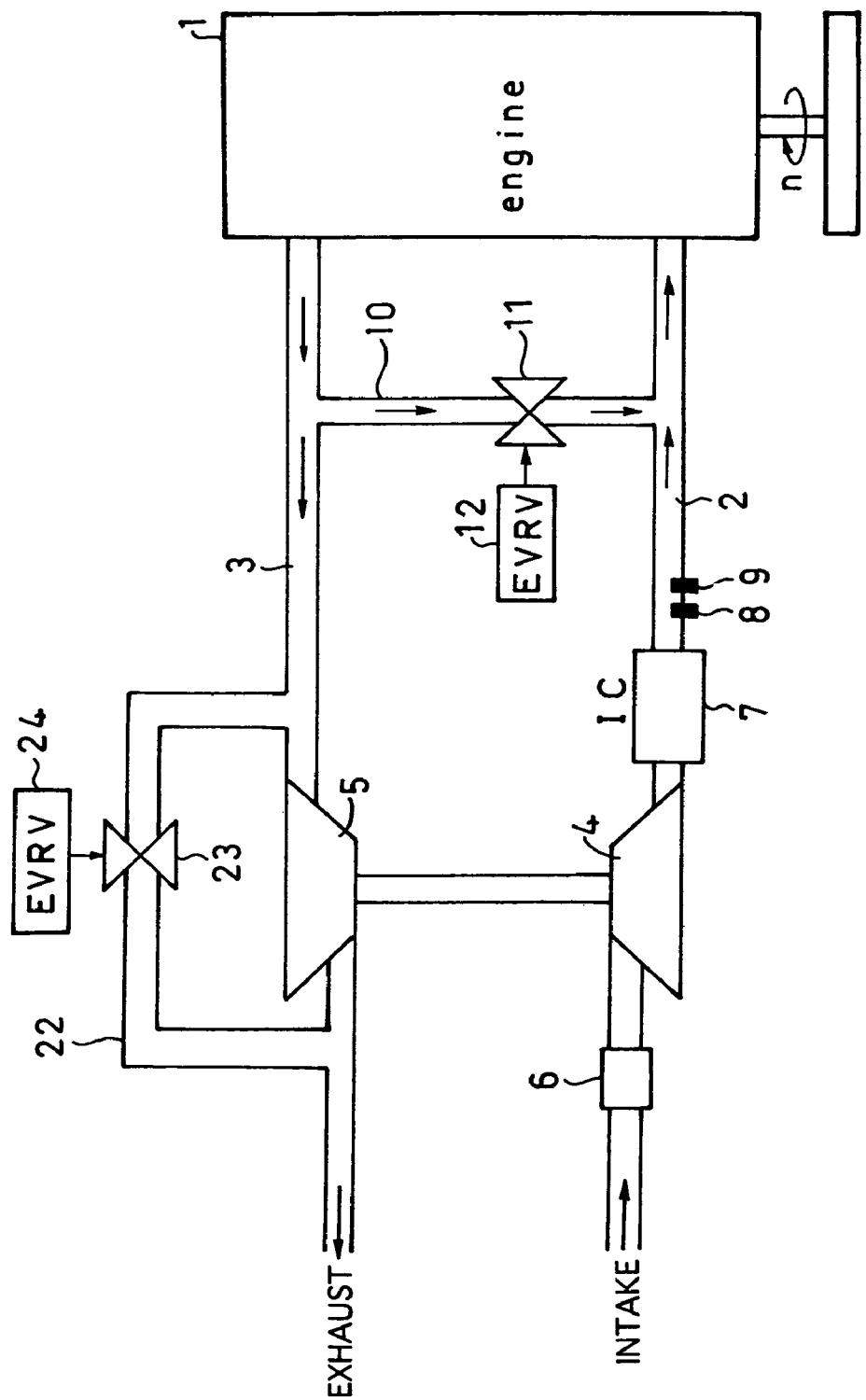
FIG. 9 is a structural view showing an exemplary overall structure of the fourth exemplary structure of the exhaust gas recirculation apparatus according to the embodiment of this invention.

First, FIG. 9 shows an overall schematic structure of this fourth exemplary structure. As will be described hereinafter with reference to FIG. 9, in this fourth exemplary structure, a turbine connection tube 22 for connecting the inlet and outlet of the exhaust turbine 5 is provided between these inlet and outlet, and an exhaust turbine adjustment valve 23 is provided to enable adjustment of the quantity of exhaust gas inputted to the exhaust turbine 5.

The exhaust turbine adjustment valve 23 is of a so-called negative-pressure type having the same structure as the above-described exhaust gas recirculation valve 11. The magnitude of its negative pressure is adjustable by a turbine electromagnetic vacuum adjustment valve 24 having the same structure as the above-described the electromagnetic vacuum adjustment valve 12.

Also the decision of the driving duty for this turbine electromagnetic vacuum adjustment valve 24 is basically the same as in the case of the above-described electromagnetic vacuum adjustment valve 12. The decision is made in accordance with the arithmetic procedures described above with reference to FIG. 6. Its EGR/boost arithmetic processing is different as follows.

Figure 8:
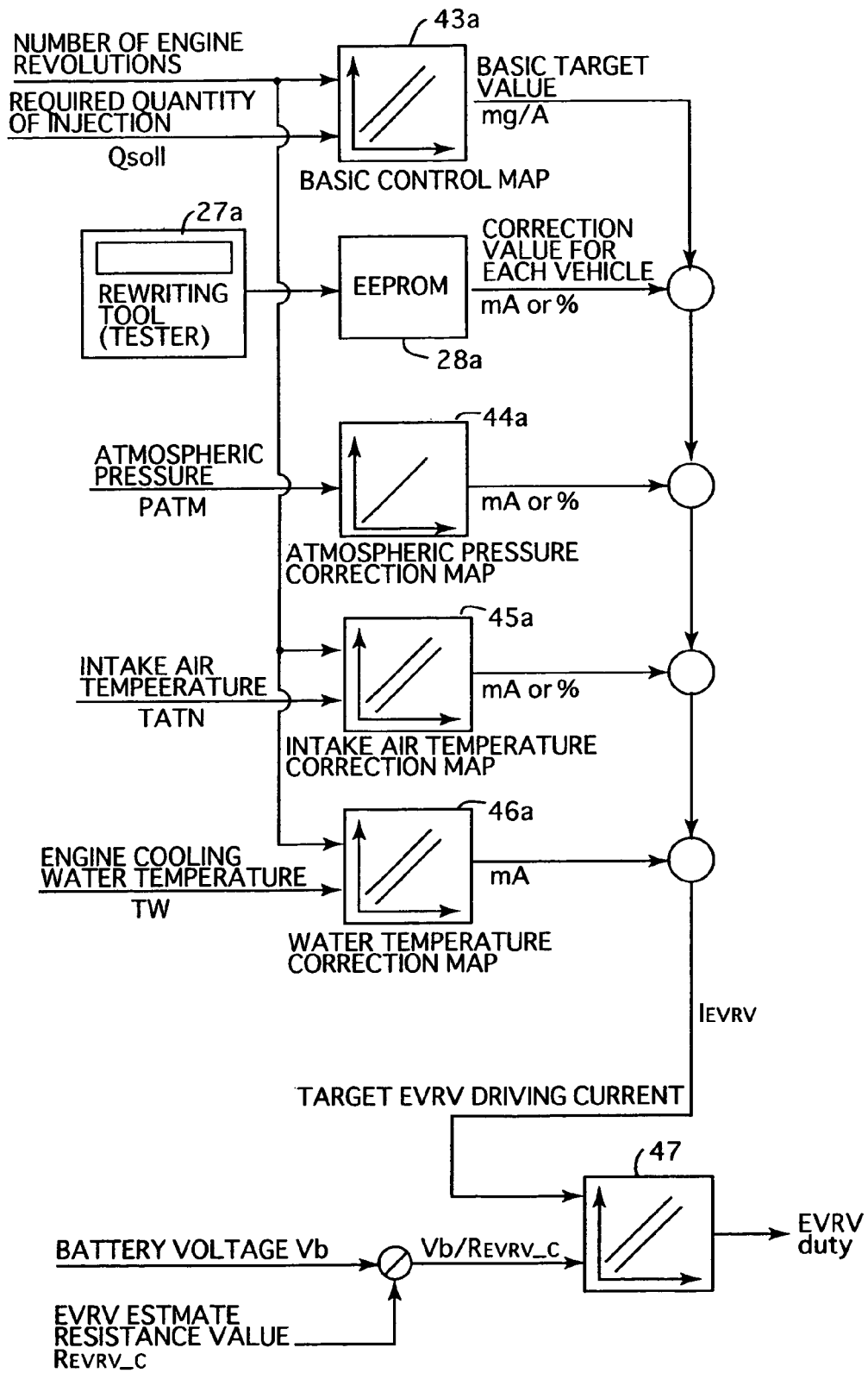
FIG. 8 is an explanatory view for explaining specific EGR/boost arithmetic processing in the third exemplary structure of the exhaust gas recirculation apparatus according to the embodiment of this invention.

In this fourth exemplary structure, the technique of deciding the driving duty for the electromagnetic vacuum adjustment valve 12 to adjust the opening of the exhaust gas recirculation valve 11 can use the arithmetic processing shown in either FIG. 7 or FIG. 8 and is not particularly specified here.

Figure 10:
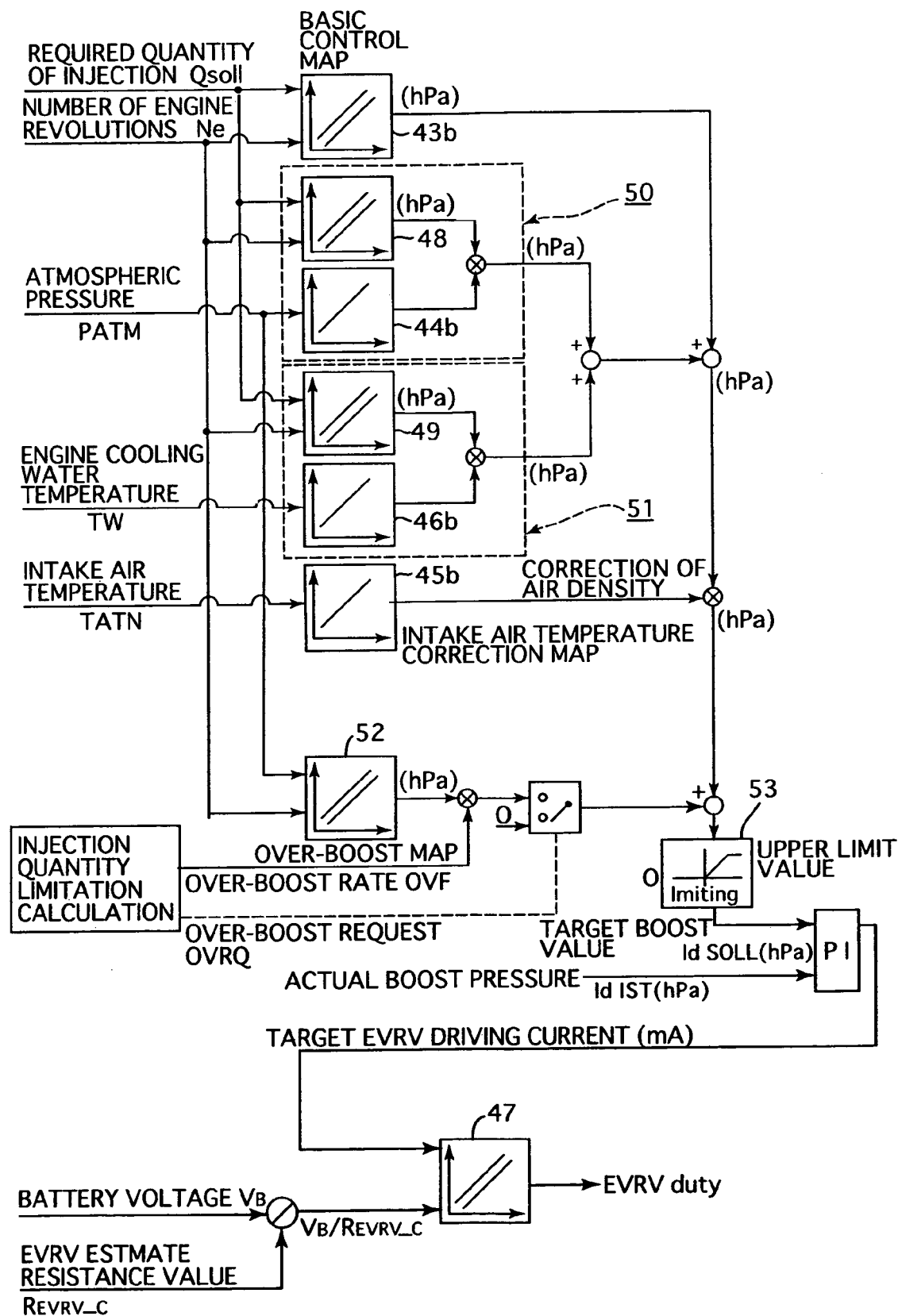
FIG. 10 is an explanatory view for explaining specific EGR/boost arithmetic processing in the fourth exemplary structure of the exhaust gas recirculation apparatus according to the embodiment of this invention.

FIG. 10 shows an explanatory view for explaining specific procedures of the EGR/boost arithmetic processing to calculate the driving duty for the turbine electromagnetic vacuum adjustment valve 24. The specific procedures will now be described with reference to FIG. 10.

First, also in this fourth exemplary structure, a basic control map 43b, an atmospheric pressure correction map 44b, an intake air temperature correction map 45b and a water temperature correction map 46b are provided, as in the above-described exemplary structure shown in FIG. 7. Inputs to and outputs from these maps are basically the same as in the exemplary structure shown in FIG. 7. However, in this exemplary structure, only the basic control map 43b use the unit hpa for its output. Correction values acquired from the atmospheric pressure correction map 44b, the intake air temperature correction map 45b and the water temperature correction map 46b are unlabeled numbers.

Moreover, in this fourth exemplary structure, an atmospheric pressure correction value modification map 48 and a water temperature correction value modification map 49 are provided.

The atmospheric pressure correction value modification map 48 is for modifying the correction value acquired from the atmospheric pressure correction map 44b in consideration of the influence of the required quantity of injection Qsoll and the number of engine revolutions Ne. The atmospheric pressure correction value modification map 48 is formed by mapping to define modification data from the number of engine revolutions Ne and the required quantity of injection Qsoll on the basis of experiments, simulations or the like. Data acquired from this atmospheric pressure correction value modification map 48 uses the unit of hpa and the output value from the atmospheric pressure correction map 44b is multiplied by this data.

This atmospheric pressure correction value modification map 48 and the atmospheric pressure correction map 44b form a four-dimensional atmospheric pressure correction map 50.

The water temperature correction value modification map 49 is for modifying the correction value acquired from the water temperature correction map 46b in consideration of the influence of the required quantity of injection Qsoll and the number of engine revolutions Ne. The water temperature correction value modification map 49 is formed by mapping to define modification data from the number of engine revolutions Ne and the required quantity of injection Qsoll on the basis of experiments, simulations or the like. Data acquired from this water temperature correction value modification map 49 uses the unit of hpa and the output value from the water temperature correction map 46b is multiplied by this data.

The water temperature correction value modification map 49 and the water temperature correction map 46b form a four-dimensional water temperature correction map 51.

The output value of the four-dimensional atmospheric pressure correction map 50 and the output value of the four-dimensional water temperature correction map 51 are added together and then added to the output value of the basic control map 43b. In this fourth exemplary structure, the result of this addition is called "first corrected basic target value" for convenience.

This first corrected basic target value is multiplied by the output value of the intake air temperature correction map 45b. In this fourth exemplary structure, the result of this multiplication is called "second corrected basic target value" for convenience.

In this fourth exemplary structure, correction based on over-boost is made.

That is, first, the required quantity of injection Qsoll is usually defined by fuel injection control without exceeding a predetermined upper limit value. However, the upper limit value may be changed under predetermined conditions. To make correction in accordance with a change of the upper limit value of the required quantity of injection Qsoll, first, an over-boost map 52 is provided. The over-boost map 52 is a map that is set to define a correction value for the above-described second corrected basic target value from the atmospheric pressure PATM and the number of engine revolutions Ne in accordance with a change of the upper limit value of the required quantity of injection Qsoll. Its output value has the unit of hPa.

In the electronic control unit 31, arithmetic processing for fuel injection limitation of a series of control processing for fuel injection control is performed. In this arithmetic processing, when it is judged that a change of the upper limit value of the required quantity of injection Qsoll is necessary under predetermined conditions, an over-boost request (OVRQ) is outputted and an over-boost rate (OVF) is provided.

The output value of the above-described over-boost map 52 is multiplied by the over-boost rate (OVF). The over-boost request (OVRQ) functions as a signal for selection as to whether the multiplication value of the output value of the over-boost map 52 and the over-boost rate (OVF) should be added to the second corrected basic target value. In the embodiment of this invention, if the value of the over-boost request is "1" (logical value of High), the multiplication value of the output value of the over-boost map 52 and the over-boost rate (OVF) is added to the second corrected basic target value. In FIG. 10, the selecting part to select addition of the multiplication value of the output value of the over-boost map 52 and the over-boost rate (OVF) to the second corrected basic target value due to the over-boost request (OVRQ) is expressed as a switch mechanism, for convenience.

Here, this addition value is called "third corrected basic target value" for convenience.

Then, a limiter 53 is provided for preventing the third corrected basic target value from exceeding a predetermined positive value and from becoming a negative value. This limiter 53 directly outputs the third corrected basic target value up to a predetermined limit value. However, when the third corrected basic target value reaches the predetermined limit value, after that, the limiter 53 outputs the predetermined limit value until the third corrected basic target value becomes lower than the predetermined limit value. The output value from this limiter 53 is called "target boost value (ldSOLL)" for convenience.

Next, a target EVRV driving current (mA) is found by proportional control (in FIG. 10, denoted by "PI") using the target boost value (ldSOLL) and actual boost pressure (ldIST) detected by the boost pressure sensor 9. This PI control is basically the same as the PI control described previously in the exemplary structure of FIG. 7. Replacing the "target air quantity value (arSoll) in FIG. 7 with the "target boost value (ldSOLL)" and also replacing the "quantity of actual intake (arIST)" with the "actual boost pressure (ldIST)", the fundamental arithmetic processing is the same and therefore will not be described further in detail.

Finally, from the target EVRV driving current (mA), the battery voltage (Vb) and the corrected estimate resistance value ($R_{EVRV\_c}$), a driving duty (EVRV duty) is found by using the duty decision map 47 in a manner as described in the exemplary structure of FIG. 7. The decision of the driving duty (EVRV duty) using the duty decision map 47 is the same as in the exemplary structure shown in FIG. 7 and therefore will not be described further in detail.

Now, EGR/boost arithmetic processing for calculating the driving duty in the above-described structure will be summarized. First, a basic target value of the boost pressure that should be acquired by energization to the turbine electromagnetic vacuum adjustment valve 24 is found from the basic control map 43b on the basis of the number of engine revolutions Ne and the required quantity of injection Qsoll.

Next, the sum of the output value of the above-described four-dimensional atmospheric pressure correction map 50 and the output value of the four-dimensional water temperature correction map 51 is added to the basic target value. The first corrected basic target value is thus found.

Moreover, this first corrected basic target value is multiplied by the output value of the intake air temperature correction map 45b. The second corrected basic target value is thus found.

Then, when an over-boost request (OVRQ) by fuel injection control is not made, the second corrected basic target value goes through the limiter 53 and then is used for arithmetic processing for PI control together with the actual boost pressure. The target EVRV driving current (mA) is thus found. On the other hand, when an over-boost request (OVRQ) is made, the multiplication value of the output value of the over-boost map 52 and the over-boost rate (OVF) is added to the second corrected basic target value, thus becoming the third corrected basic target value. The third corrected basic target value goes through the limiter 53 and then is used for arithmetic processing for PI control together with the actual boost pressure. The target EVRV driving current (mA) is thus found.

Finally, the driving duty is found from the duty decision map 47 on the basis of the target EVRV driving current value (mA) and the value of the battery voltage (Vb) divided by the corrected estimate resistance value ($R_{EVRV\_c}$).

By such control, the turbine electromagnetic vacuum adjustment valve 24 is driven while temperature changes are compensated in advance. Therefore, so-called hunting action can be prevented and boost pressure can be stably converged on the target value without being influence by the temperature.

In all the above-described exemplary structures, the electromagnetic vacuum adjustment value 12 or the turbine electromagnetic vacuum adjustment valve 24 having the so-called well-known electromagnetic valve structure is used as the electrically controlled valve. However, the electrically controlled valve need not be limited to such electromagnetic valves, and of course, this invention can be applied to, for example, a structure employing a motor-driven valve as an electrically controlled valve.

Figure 11:
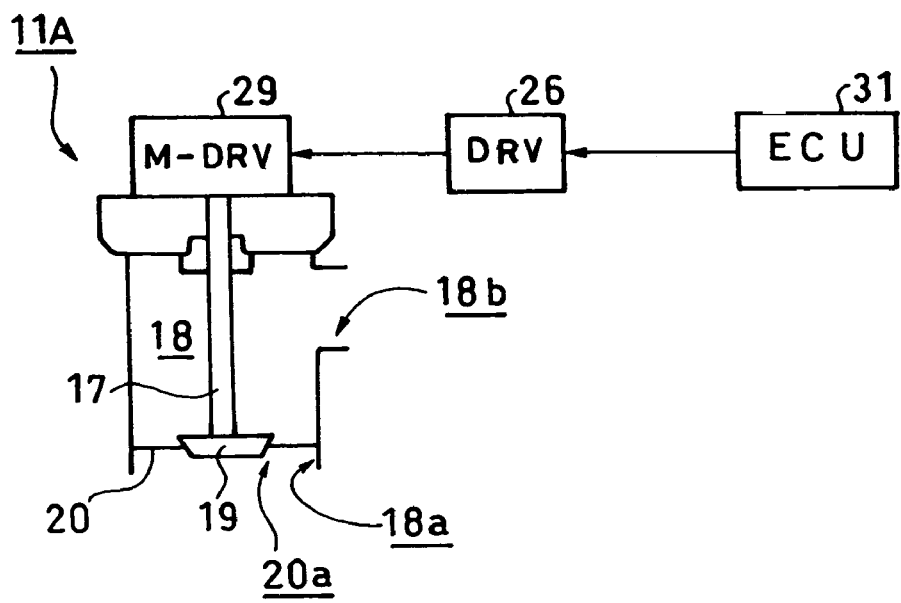
FIG. 11 is a structural view showing an exemplary basic structure of an exhaust gas recirculation valve in the case where a motor-driven valve, which is an electrically controlled valve, is used as the exhaust gas recirculation valve.

FIG. 11 shows an exemplary basic structure in the case where a motor-driven valve, which is an electrically controlled valve, is used as an exhaust gas recirculation valve. Hereinafter, the exemplary structure will be described with reference to FIG. 11. The same constituent elements as those of the exhaust gas recirculation valve 11 shown in FIG. 2 are denoted by the same numerals and will not be described further in detail.

This exhaust gas recirculation valve 11A has a motor driving unit 29 (in FIG. 11, denoted by "M-DRV") for displacing the valve shaft 17 in its axial direction, when necessary. As the valve shaft 17 is displaced by this motor driving unit 29, the valve member 19 can be fitted in or removed from the through-hole 20a. As the valve member 19 is removed from the through-hole 20a, a part of exhaust gas flows into the exhaust gas outlet 18b side from the exhaust gas inlet 18a and a part of the exhaust gas is fed back to the engine 1 via the intake duct 2, as in the previous case of the exhaust gas recirculation valve 11.

Here, the motor driving unit 29 is constituted mainly by having a well-known DC motor and includes a mechanism for converting rotation to displacement in the axial direction of the valve shaft 17, that is, linear motion, when necessary. This motor driving unit 29 is similar to the previously described electromagnetic vacuum adjustment valve 12 and the turbine electromagnetic vacuum adjustment valve 24 in that its operation control is made by the electronic control unit 31 via the driving circuit 26.

The technique and mechanism to get linear motion from the rotation of the motor may be a well-known technique and mechanism such as worm gear and need not limited to any particular technique. Also, a linear motor that makes linear motion instead of rotation output as the output of the motor itself may be used. In such case, of course, the mechanism for converting rotation to linear motion is not necessary.

Figure 12:
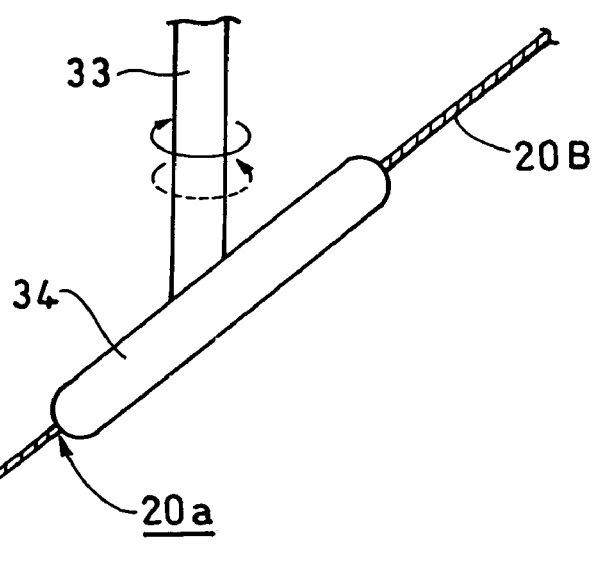
FIG. 12 is a structural view including a partial cross section showing an exemplary schematic structure in the case of opening and closing the exhaust gas recirculation valve by directly utilizing the rotation of a motor driving unit.

Moreover, a technique that uses the rotation of the motor without converting it linear motion may be used, as schematically shown in FIG. 12. That is, in FIG. 12, a rotary shaft 33 is a rotary shaft itself of a motor (not shown) constituting the motor driving unit 29, or an output shaft of a decelerating mechanism based on a reduction gear. For example, a disc-shaped flap 34 is fixed at a predetermined angle to the axial line of the rotary shaft 33. Meanwhile, a partition 20B, which is equivalent to the partition 20 in FIG. 11, is provided to face the rotary shaft 33 at the same angle as the attachment angle of the flap 34 to the rotary shaft 33, at least in the through-hole 20a opened and closed by the flap 34 and in its periphery. As the rotary shaft 33 rotates or turns in the direction of a solid arrow or in the direction of a dotted arrow in FIG. 12, the flap 34, now completely closing the through-hole 20a as shown in FIG. 12, will be shifted from the through-hole 20a by the rotation or turning of the rotary shaft 33 and will open the through-hole 20a.

In the case of using the motor-driven valve as described above instead of the electromagnetic vacuum adjustment valve 12 or the turbine electromagnetic vacuum adjustment valve 24, the exhaust gas recirculation valve 11A does not need a diaphragm valve. Therefore, a negative pressure generator need not be provided and there are advantages, for example, that more precise and more sensitive valve opening/closing control is possible.

As described above, according to this invention, by enabling driving while correcting the driving duty by a correction value that is preset using various variation elements causing changes in the energizing current instead of detecting the actual current through the electromagnetic coil, changes in the energizing current to the electromagnetic coil can be restrained relatively easily without using feedback control, and the convergence on the target value can be stabilized without being affected by the temperature. It has an effect that hunting of the valve can be securely prevented.

What is claimed is:

1. A driving control method for an electrically controlled valve used for adjusting the quantity of feedback of exhaust gas to an intake part in an exhaust gas recirculation apparatus, the method characterized by comprising:
    finding a driving duty to a variable equivalent to a target quantity of feedback of exhaust gas by using a duty conversion map that is preset to provide a driving duty of the electrically controlled valve to a variable equivalent to a target quantity of feedback of exhaust gas; and
    finding a correction value to detected battery voltage and engine cooling water temperature by using a duty correction map that is preset to provide a correction value to the driving duty from battery power and engine cooling water temperature, then finding a new driving duty for driving the electrically controlled valve on the basis of the correction value and the former driving duty, and driving the electrically controlled valve with the new driving duty.

2. A driving control program for an electrically controlled valve executed for driving control of an electrically controlled valve used for adjusting the quantity of feedback of exhaust gas to an intake part in an exhaust gas recirculation apparatus, the program characterized by comprising:
    a first step of finding a driving duty to a variable equivalent to a target quantity of feedback of exhaust gas by using a duty conversion map that is preset to provide a driving duty of the electrically controlled valve to a variable equivalent to a target quantity of feedback of exhaust gas;
    a second step of finding a correction value to detected battery voltage and engine cooling water temperature by using a duty correction map that is preset to provide a correction value to the driving duty from battery power and engine cooling water temperature; and
    a third step of finding a new driving duty on the basis of the correction value and the driving duty found at the first step.

3. An exhaust gas recirculation apparatus capable of adjusting the quantity of feedback of exhaust gas from an engine by driving an electrically controlled valve, the apparatus characterized by comprising:

basic driving duty output means that outputs a driving duty for the electrically controlled valve with respect to input of a variable equivalent to a target quantity of feedback of exhaust gas;

correction value output means that outputs a correction value for the driving duty from inputted battery voltage and engine cooling water temperature;

corrected driving duty calculation means that finds a new driving duty on the basis of the correction value provided from the correction value output means and the driving duty provided from the basic driving duty output means; and driving means that drives the electrically controlled valve on the basis of the value calculated by the corrected driving duty calculation means.

4. A driving control method for an electrically controlled valve used for adjusting the quantity of feedback of exhaust gas to an intake part in an exhaust gas recirculation apparatus, the method characterized by comprising:

finding an estimate resistance value by predetermined estimate resistance value calculation processing to calculate an estimate resistance value of an electromagnetic coil of the electrically controlled valve;

dividing a detected battery voltage by the estimate resistance value to find a resulting division value;

finding a target driving current by predetermined target driving current calculation processing to calculate a target driving current that energizes the electrically controlled valve; and finding a driving duty to the calculated target driving current and division value by using a duty decision map that is preset to provide a driving duty in energizing the electrically controlled valve from the target driving current and the division value, and driving the electrically controlled valve with the driving duty.

5. The driving control method for the electrically controlled valve in the exhaust gas recirculation apparatus as claimed in claim 4, characterized in that the predetermined target driving current calculation processing includes:

finding a basic target value by using a basic control map that is preset to define a basic target value as a basic target driving current that should be used for energizing the electrically controlled valve with respect to a detected number of engine revolutions and a required quantity of injection provided as a quantity of fuel injection to the engine by fuel injection control processing; and correcting the basic target value on the basis of environment data and vehicle type to find the target driving current.

6. The driving control method for the electrically controlled valve in the exhaust gas recirculation apparatus as claimed in claim 5, characterized in that the correction of the basic target value based on the environment data and vehicle type includes:

adding a correction value that is set for each vehicle type and stored in advance to the basic target value, and regarding the value after the arithmetic operation first corrected basic target value;

finding a correction value corresponding to a detected atmospheric pressure from an atmospheric pressure correction map that is preset to provide a correction value for the first corrected basic target value from the atmospheric pressure, adding the correction value to the first corrected basic target value, and regarding the value after the arithmetic operation as a second corrected basic target value;

finding a correction value corresponding to a detected intake air temperature from an intake air temperature correction map that is preset to provide a correction value for the second corrected basic target value from the intake air temperature, adding the correction value to the second corrected basic target value, and regarding the value after the arithmetic operation as a third corrected basic target value;

and finding a correction value corresponding to a detected engine cooling water temperature from a water temperature correction map that is preset to provide a correction value for the third corrected basic target value from the engine cooling water temperature, adding the correction value to the third corrected basic target value, and regarding the value after the arithmetic operation as a target driving current value.

7. The driving control method for the electrically controlled valve in the exhaust gas recirculation apparatus as claimed in claim 6, characterized in that multiplication by the correction value is carried out instead of the addition of the correction value in finding the first to third corrected basic target values.

8. The driving control method for the electrically controlled valve in the exhaust gas recirculation apparatus as claimed in claim 7, characterized in that the predetermined estimate resistance value calculation processing includes:

finding a quantity of heat generation of the electromagnetic coil of the electrically controlled valve by a predetermined arithmetic expression to calculate the quantity of heat generation of the electromagnetic coil from the battery voltage and the target driving current;

finding a quantity of heat radiation of the electromagnetic coil of the 10 electrically controlled valve by a predetermined arithmetic expression to calculate the quantity of heat radiation of the electromagnetic coil from either the engine cooling water temperature or the ambient temperature, and the vehicle speed; and adding the ambient temperature to an integral value of difference between the quantity of heat generation and the quantity of heat radiation.

9. The driving control method for the electrically controlled valve in the exhaust gas recirculation apparatus as claimed in claim 6, characterized in that the predetermined estimate resistance value calculation processing includes:

finding a quantity of heat generation of the electromagnetic coil of the electrically controlled valve by a predetermined arithmetic expression to calculate the quantity of heat generation of the electromagnetic coil from the battery voltage and the target driving current;

finding a quantity of heat radiation of the electromagnetic coil of the electrically controlled valve by a predetermined arithmetic expression to calculate the quantity of heat radiation of the electromatic coil from either the engine cooling water temperature, and the vehicle speed; and adding the ambient temperature to an intergral value of difference between the quantity of heat generation and the quantity of heat radiation.

10. The driving control method for the electrically controlled valve in the exhaust gas recirculation apparatus as claimed in claim 4, characterized in that the predetermined target driving current calculation processing includes:

finding a basic target value by using a basic control map that is preset to define a basic target value as a basic target driving current that should be used for energizing the electrically controlled valve with respect to a detected number of engine revolutions and a required quantity of injection provided as a quantity of fuel injection to the engine by fuel injection control processing; and correcting the basic target value on the basis of environment data and vehicle type, and calculating a target driving current to be used for energizing the electrically controlled valve, by a preset proportional and integral control arithmetic expression using the corrected basic target value and a detected quantity of intake.

11. The driving control method for the electrically controlled valve in the exhaust gas recirculation apparatus as claimed in claim 10, characterized in that the correction of the basic target value based on the environment data and vehicle type includes:

adding a correction value that is set for each vehicle type and stored in advance to the basic target value, and regarding the value after the arithmetic operation as a first corrected basic target value;

finding a correction value corresponding to a detected atmospheric pressure from an atmospheric pressure correction map that is preset to provide a correction value for the first corrected basic target value from the atmospheric pressure, adding the correction value to the first corrected basic target value, and regarding the value after the arithmetic operation as a second corrected basic target value;

finding a correction value corresponding to a detected intake air temperature from an intake air temperature correction map that is preset to provide a correction value for the second corrected basic target value from the intake air temperature, adding the correction value to the second corrected basic target value, and regarding the value after the arithmetic operation as a third corrected basic target value; and finding a correction value corresponding to a detected engine cooling water temperature from a water temperature correction map that is preset to provide a correction value for the third corrected basic target value from the engine cooling water temperature, adding the correction value to the third corrected basic target value, and thus acquiring a corrected basic target value.

12. The driving control method for the electrically controlled valve in the exhaust gas recirculation apparatus as claimed in claim 11, characterized in that multiplication by the correction value is carried out instead of the addition of the correction value in finding the first to third corrected basic target values.

13. The driving control method for the electrically controlled valve in the exhaust gas recirculation apparatus as claimed in claim 11, characterized in that the predetermined estimate resistance value calculation processing includes:

finding a quantity of heat generation of the electromagnetic coil of the electrically controlled valve by a predetermined arithmetic expression to calculate the quantity of heat generation of the electromagnetic coil from the battery voltage and the target driving current;

finding a quantity of heat radiation of the electromagnetic coil of the electrically controlled valve by a predetermined arithmetic expression to calculate the quantity of heat radiation of the electromagnetic coil from either the engine cooling water temperature or the ambient temperature, and the vehicle speed; and adding the ambient temperature to an integral value of difference between the quantity of heat generation and the quantity of heat radiation.

14. An exhaust gas recirculation apparatus capable of adjusting the quantity of feedback of exhaust gas to an intake part from an engine by driving an electrically controlled valve, the apparatus characterized by comprising:

an electronic control unit that arithmetically calculates a driving duty for the electrically controlled valve; and a driving circuit that energizes and drives the electrically controlled valve on the basis of the driving duty from the electronic control unit;

wherein the electronic control unit finds an estimate resistance value by predetermined estimate resistance value calculation processing to calculate an estimate resistance value of an electromagnetic coil of the electrically controlled valve, divides a detected battery voltage by the estimate resistance value to find a resulting division value;

finds a target driving current by predetermined target driving current calculation processing to calculate a target driving current that energizes the electrically controlled valve, and finds a driving duty to the calculated target driving current and division value by using a duty decision map that is preset to provide a driving duty in energizing the electrically controlled valve from the target driving current and the division value, and outputs the driving duty to the driving circuit.

15. The exhaust gas recirculation apparatus as claimed in claim 14, characterized in that the predetermined target driving current calculation processing includes:

finding a basic target value by using a basic control map that is preset to define a basic target value as a basic target driving current that should be used for energizing the electrically controlled valve with respect to a detected number of engine revolutions and a required quantity of injection provided as a quantity of fuel injection to the engine by fuel injection control processing; and correcting the basic target value on the basis of environment data and vehicle type to find the target driving current.

16. The exhaust gas recirculation apparatus as claimed in claim 14, characterized in that the correction of the basic target value based on the environment data and vehicle type includes:

adding a correction value that is set for each vehicle type and stored in advance to the basic target value, and regarding the value after the arithmetic operation as a first corrected basic target value;

finding a correction value corresponding to a detected atmospheric pressure from an atmospheric pressure correction map that is preset to provide a correction value for the first corrected basic target value from the atmospheric pressure, adding the correction value to the first corrected basic target value, and regarding the value after the arithmetic operation as a second corrected basic target value, finding a correction value corresponding to a detected intake air temperature from an intake air temperature correction map that is preset to provide a correction value for the second corrected basic target value from the intake air temperature, adding the correction value to the second corrected basic target value, and regarding the value after the arithmetic operation as a third corrected basic target value; and finding a correction value corresponding to a detected engine cooling water temperature from a water temperature correction map that is preset to provide a correction value for the third corrected basic target value from the engine cooling water temperature, adding the correction value to the third corrected basic target value, and regarding the value after the arithmetic operation as a target driving current value.

17. The exhaust gas recirculation apparatus as claimed in claim 16, characterized in that multiplication by the correction value is carried out instead of the addition of the correction value in finding the first to third corrected basic target values.

18. The exhaust gas recirculation apparatus as claimed in claim 17, characterized in that the predetermined estimate resistance value calculation processing includes:
  finding a quantity of heat generation of the electromagnetic coil of the electrically controlled valve by a predetermined arithmetic expression to calculate the quantity of heat generation of the electromagnetic coil from the battery voltage and the target driving current;
  finding a quantity of heat radiation of the electromagnetic coil of the electrically controlled valve by a predetermined arithmetic expression to calculate the quantity of heat radiation of the electromagnetic coil from either the engine cooling water temperature or the ambient temperature, and the vehicle speed; and adding the ambient temperature to an integral value of difference between the quantity of heat generation and the quantity of heat radiation.

19. The exhaust gas recirculation apparatus as claimed in claim 16, characterized in that the predetermined estimate resistance value calculation processing includes:
  finding a quantity of heat generation of the electromagnetic coil of the electrically controlled valve by a predetermined arithmetic expression to calculate the quantity of heat generation of the electromagnetic coil from the battery voltage and the target driving current;
  finding a quantity of heat radiation of the electromagnetic coil of the electrically controlled valve by a predetermined arithmetic expression to calculate the quantity of heat radiation of the electromagnetic coil from either the engine cooling water temperature or the ambient temperature, and the vehicle speed; and
  adding the ambient temperature to an integral value of difference between the quantity of heat generation and the quantity of heat radiation.

20. The exhaust gas recirculation apparatus as claimed in claim 14, characterized in that the predetermined target driving current calculation processing includes: finding a basic target value by using a basic control map that is preset to define a basic target value as a basic target driving current that should be used for
  energizing the electrically controlled valve with respect to a detected number of engine revolutions and a required quantity of injection provided as a quantity of fuel injection to the engine by fuel injection control processing; and
  correcting the basic target value on the basis of environment data and vehicle type, and calculating a target driving current to be used for energizing the electrically controlled valve, by a preset proportional and integral control arithmetic expression using the corrected basic target value and a detected quantity of intake.

21. The exhaust gas recirculation apparatus as claimed in claim 20, characterized in that the correction of the basic target value based on the environment date and vehicle type includes:
  adding a correction value that is set for each vehicle type and stored in advance to the basic target value, and regarding the value after the arithmetic operation as a first corrected basic target value;
  finding a corrrection value corresponding to a detected atmospheric pressure from an atmospheric pressure correction map that is preset to provide a correction value for the first corrected basic target value from the atmospheric pressure, adding the correction value to the first corrected basic target value, and regarding the value after the arithmetic operation as a second corrected basic target value;
  finding a correction value corresponding to a detected intake air temperature from an intake air temperature correction map that is preset to provide a correction value for the second corrected basic target value from the intake air temperature, adding the correction value to the second corrected basic target value, and regarding the value after the arithmetic operation as a third corrected basic target value; and
  finding a correction value corresponding to a detected engine cooling water temperature from a water temperature correction map that is preset to provide a correction value for the third corrected basic target value from the engine cooling water temperature, adding the correction value to the third corrected basic target value, and thus acquiring a corrected basic target value.

22. The exhaust gas recirculation apparatus as claimed in claim 21, characterized in that multiplication by the correction value is carried out instead of the addition of the correction value in finding the first to third corrected basic target values.

23. The exhaust gas recirculation apparatus as claimed in claim 21, characterized in that the predetermined estimate resistance value calculation processing includes:
  finding a quantity of heat generation of the electromagnetic coil of the electrically controlled valve by a predetermined arithmetic expression to calculate the quantity of heat generation of the electromagnetic coil from the battery voltage and the target driving current;
  finding a quantity of heat radiation of the electromagnetic coil of the electrically controlled valve by a predetermined arithmetic expression to calculate the quantity of heat radiation of the electromagnetic coil from either the engine cooling water temperature or the ambient temperature, and the vehicle speed; and adding the ambient temperature to an integral value of difference between the quantity of heat generation and the quantity of heat radiation.

24. A driving control method for an electrically controlled valve for turbine used for adjusting the quantity of passage of exhaust gas through a turbine connection tube provided to connect inlet and outlet ports of an exhaust turbine provided at a halfway part of an exhaust duct in an exhaust gas recirculation apparatus, the method characterized by comprising:
  finding an estimate resistance value by predetermined estimate resistance value calculation processing to calculate an estimate resistance value of an electromagnetic coil of the electrically controlled valve for turbine;
  dividing a detected battery voltage by the estimate resistance value to find a resulting division value;
  finding a target driving current by predetermined target driving current calculation processing to calculate a target driving current that energizes the electrically controlled valve for turbine; and finding a driving duty to the calculated target driving current and division value by using a duty decision map that is preset to provide a driving duty in energizing the electrically controlled valve for turbine from the target driving current and the division value, and driving the electrically controlled valve for turbine with the driving duty.

25. The driving control method for the electrically controlled valve for turbine in the exhaust gas recirculation apparatus as claimed in claim 24, characterized in that the predetermined target driving current calculation processing includes:

finding a basic target value by using a basic control map that is preset to define a basic target value as a basic target driving current that should be used for energizing the electrically controlled valve for turbine with respect to a detected number of engine revolutions and a required quantity of injection provided as a quantity of fuel injection to the engine by fuel injection control processing; and correcting the basic target value on the basis of environment data and fuel injection conditions, and calculating a target driving current to be used for energizing the electrically controlled valve for turbine, by a preset proportional and integral control arithmetic expression using the corrected basic target value and a detected actual boost pressure.

26. The driving control method for the electrically controlled valve for turbine in the exhaust gas recirculation apparatus as claimed in claim 25, characterized in that the correction based on the environment data and fuel injection conditions includes:

finding a correction value corresponding to a detected atmospheric pressure from an atmospheric pressure correction map that is preset to provide a correction value for the basic target value from the atmospheric pressure;

finding a modification value corresponding to the detected number of engine revolutions and the required quantity of injection from an atmospheric pressure correction value modification map that is preset to provide a modification value for the correction value acquired from the atmospheric pressure correction map on the basis of the number of engine revolutions and the required quantity of fuel injection;

finding a multiplication value of the correction value acquired from the atmospheric pressure correction map and the modification value acquired from the atmospheric pressure correction value modification map, and regarding the multiplication value as an atmospheric pressure correction value;

finding a correction value corresponding to a detected engine cooling water temperature from a water temperature correction map that is preset to provide a correction value for the basic target value from the engine cooling water temperature;

finding a modification value corresponding to the detected number of engine revolutions and the required quantity of injection from a water temperature correction value modification map that is preset to provide a modification value for the correction value acquired from the water temperature correction map on the basis of the number of engine revolutions and the required quantity of fuel injection;

finding a multiplication value of the correction value acquired from the water temperature correction map and the modification value acquired from the water temperature correction value modification map, and regarding the multiplication value as a water temperature correction value;

adding the atmospheric pressure correction value to the water temperature correction value to acquire a first corrected basic target value;

finding a correction value corresponding to a detected intake air temperature from an intake air temperature correction map that is preset to provide a correction value for the first corrected basic target value from the intake air temperature, multiplying the first corrected basic target value by the correction value, and regarding the multiplication value as a second corrected basic target value;

adding an over-boost correction value to the second corrected basic target value to acquire a third corrected basic target value, the over-boost correction value being defined by the presence/absence of an over-boost request generated by fuel injection control, the over-boost correction value being set at zero if no over-boost request is generated, and if over-boost request is generated, the over-boost correction value being set at a multiplication value of a correction value corresponding to the detected number of engine revolutions and the required quantity of injection from an over-boost map that is preset to provide a correction value for the second corrected basic target value on the basis of the number of engine revolutions and the required quantity of fuel injection, and an over-boost rate acquired by fuel injection control; and if the third corrected basic target value is a negative value, outputting zero, or if the third corrected basic target value is a positive value, regarding the third corrected basic target value up to a predetermined upper limit value as a final value in a series of correction processing, and if the third corrected basic target value is over the predetermined upper limit value, performing limiter processing to regard the predetermined upper limit value as a new third corrected basic target value, which is a final value in the series of correction processing.

27. The driving control method for the electrically controlled valve for turbine in the exhaust gas recirculation apparatus as claimed in claim 26, characterized in that the predetermined estimate resistance value calculation processing includes:

finding a quantity of heat generation of the electromagnetic coil of the electrically controlled valve by a predetermined arithmetic expression to calculate the quantity of heat generation of the electromagnetic coil from the battery voltage and the target driving current;

finding a quantity of heat radiation of the electromagnetic coil of the electrically controlled valve by a predetermined arithmetic expression to calculate the quantity of heat radiation of the electromagnetic coil from either the engine cooling water temperature or the ambient temperature, and the vehicle speed; and adding the ambient temperature to an integral value of difference between 20 the quantity of heat generation and the quantity of heat radiation.

28. An exhaust gas recirculation apparatus in which a turbine connection tube is provided to connect inlet and outlet ports of an exhaust turbine provided at a halfway part of an exhaust duct and in which an electrically controlled valve for turbine used for adjusting the quantity of passage of exhaust gas through the turbine connection tube is provided, the apparatus characterized by comprising:

an electronic control unit that arithmetically calculates a driving duty for the electrically controlled valve for turbine; and a driving circuit that energizes and drives the electrically controlled valve for turbine on the basis of the driving duty from the electronic control unit; wherein the electronic control unit finds an estimate resistance value by predetermined estimate resistance value calculation processing to calculate an estimate resistance value of an electromagnetic coil of the electrically controlled valve for turbine, divides a detected battery voltage by the estimate resistance value to find a resulting division value, finds a target driving current by predetermined target driving current calculation processing to calculate a target driving current that energizes the electrically controlled valve for turbine, and finds a driving duty to the calculated target driving current and division value by using a duty decision map that is preset to provide a driving duty in energizing the electrically controlled valve for turbine from the target driving current and the division value, and drives the electrically controlled valve for turbine with the driving duty.

29. The exhaust gas recirculation apparatus as claimed in claim 28, characterized in that the predetermined target driving current calculation processing includes:

finding a basic target value by using a basic control map that is preset to define a basic target value as a basic target driving current that should be used for energizing the electrically controlled valve for turbine with respect to a detected number of engine revolutions and a required quantity of injection provided as a quantity of fuel injection to the engine by fuel injection control processing; and correcting the basic target value on the basis of environment data and fuel injection conditions, and calculating a target driving current to be used for energizing the electrically controlled valve for turbine, by a preset proportional and integral control arithmetic expression using the corrected basic target value and a detected actual boost pressure.

30. The exhaust gas recirculation apparatus as claimed in claim 29, characterized in that the correction based on the environment data and fuel injection conditions includes:

finding a correction value corresponding to a detected atmospheric pressure from an atmospheric pressure correction map that is preset to provide a correction value for the basic target value from the atmospheric pressure;

finding a modification value corresponding to the detected number of engine revolutions and the required quantity of injection from an atmospheric pressure correction value modification map that is preset to provide a modification value for the correction value acquired from the atmospheric pressure correction map on the basis of the number of engine revolutions and the required quantity of fuel injection;

finding a multiplication value of the correction value acquired from the atmospheric pressure correction map and the modification value acquired from the atmospheric pressure correction value modification map, and regarding the multiplication value as an atmospheric pressure correction value;

finding a correction value corresponding to a detected engine cooling water temperature from a water temperature correction map that is preset to provide a correction value for the basic target value from the engine cooling water temperature:

finding a modification value corresponding to the detected number of engine revolutions and the required quantity of injection from a water temperature correction value modification map that is preset to provide a modification value for the correction value acquired from the water temperature correction map on the basis of the number of engine revolutions and the required quantity of fuel injection; finding a multiplication value of the correction value acquired from the water temperature correction map and the modification value acquired from the 15 water temperature correction value modification map, and regarding the multiplication value as a water temperature correction value;

adding the atmospheric pressure correction value to the water temperature correction value to acquire a first corrected basic target value;

finding a correction value corresponding to a detected intake air temperature from an intake air temperature correction map that is preset to provide a correction value for the first corrected basic target value from the intake air temperature, multiplying the first corrected basic target value by the correction value, and regarding the multiplication value as a second corrected basic target value;

adding an over-boost correction value to the second corrected basic target value to acquire a third corrected basic target value, the over-boost correction value being defined by the presence/absence of an over-boost request generated by fuel injection control, the over-boost correction value being set at zero if no over-boost request is generated, and if over-boost request is generated, the over-boost correction value being set at a multiplication value of a correction value corresponding to the detected number of engine revolutions and the required quantity of injection from an over-boost map that is preset to provide a correction value for the second corrected basic target value on the basis of the number of engine revolutions and the required quantity of fuel injection, and an over-boost rate acquired by fuel injection control;

and if the third corrected basic target value is a negative value, outputting zero, or if the third corrected basic target value is a positive value, regarding the third corrected basic target value up to a predetermined upper limit value as a final value in a series of correction processing, and if the third corrected basic target value is over the predetermined upper limit value, performing limiter processing to regard the predetermined upper limit value as a new third corrected basic target value, which is a final value in the series of correction processing.

31. The exhaust gas recirculation apparatus as claimed in claim 30, characterized in that the predetermined estimate resistance value calculation processing includes: finding a quantity of heat generation of the electromagnetic coil of the electrically controlled valve by a predetermined arithmetic expression to calculate the quantity of heat generation of the electromagnetic coil from the battery voltage and the target driving current;

finding a quantity of heat radiation of the electromagnetic coil of the electrically controlled valve by a predetermined arithmetic expression to calculate the quantity of heat radiation of the electromagnetic coil from either the engine cooling water temperature or the ambient temperature, and the vehicle speed; and adding the ambient temperature to an integral value of difference between the quantity of heat generation and the quantity of heat radiation.

* * * * *